(12) United States Patent
Kawamura

(10) Patent No.: US 8,279,489 B2
(45) Date of Patent: Oct. 2, 2012

(54) IMAGE PROCESSING APPARATUS AND CONTROL METHOD THEREOF FOR CONVERTING MULTILEVEL IMAGE DATA TO BINARY DATA USING AN ERROR DIFFUSION METHOD

(75) Inventor: Naoto Kawamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 521 days.

(21) Appl. No.: 12/570,539

(22) Filed: Sep. 30, 2009

(65) Prior Publication Data

US 2010/0091331 A1 Apr. 15, 2010

(30) Foreign Application Priority Data

Oct. 10, 2008 (JP) ................................. 2008-264626

(51) Int. Cl.
*H04N 1/40* (2006.01)
(52) U.S. Cl. ...................... 358/3.03; 358/3.01; 358/3.02; 358/3.04; 358/3.05
(58) Field of Classification Search .................. None
See application file for complete search history.

(56) References Cited

U.S. PATENT DOCUMENTS

| | | | | |
|---|---|---|---|---|
| 5,581,371 | A * | 12/1996 | Spaulding et al. | 358/3.03 |
| 6,333,793 | B1 * | 12/2001 | Kobayashi | 358/1.9 |
| 6,614,556 | B1 * | 9/2003 | Hong et al. | 358/3.03 |
| 6,751,358 | B1 * | 6/2004 | Mantell et al. | 382/252 |
| 6,798,537 | B1 | 9/2004 | Lau et al. | |
| 6,970,273 | B1 * | 11/2005 | Inoue | 358/3.02 |
| 7,268,919 | B2 * | 9/2007 | Katsuyama | 358/3.03 |
| 7,474,443 | B2 * | 1/2009 | Mizutani et al. | 358/3.03 |
| 2006/0244981 | A1 * | 11/2006 | Li et al. | 358/1.9 |
| 2007/0159657 | A1 * | 7/2007 | Nakano et al. | 358/3.13 |

FOREIGN PATENT DOCUMENTS

| | | |
|---|---|---|
| JP | 63-288566 A | 11/1988 |
| JP | 2002-033914 A | 1/2002 |
| JP | 2004-172798 A | 6/2004 |
| JP | 2008-017255 A | 1/2008 |

OTHER PUBLICATIONS

A Halftoning Method Using Circular Cell, NIHON GAZO GAKKAISHI, 46, 103-106 (2007) Nobuhiro Karito, Cited in the Specification [0006] (Japanese Document and English Abstract in the front page of the document).
Error Diffusion Algorithm with Output Position Constraints for Homogeneous Highlight and Shadow Dot Distribution, Journal of Electronic Imaging, Jan. 2000, vol. 9(1), pp. 46-51, Gabriel Marcu, Cited in the Specification [0007].

* cited by examiner

*Primary Examiner* — Dung Tran
(74) *Attorney, Agent, or Firm* — Cowan, Liebowitz & Latman, P.C.

(57) ABSTRACT

A technique for performing high-quality cluster type FM halftone image output without "anisotropy" or "sweep out texture" phenomenon is provided. An error diffused to a current pixel position and a random number RND are added by an adder to multi-level pixel data as a subject of binarization, and supplied as pixel data Pxy to a selector. The selector compares the pixel data Pxy with thresholds, and supplies the pixel data Pxy to one of a highlight portion processor, a dark portion processor and an intermediate portion processor. The highlight and dark portion processors refer to already-binarized results within a range determined in accordance with the value of the input pixel data Pxy, and determine a binarization result Qxy. The intermediate portion processor compares a threshold, which monotonously increases in accordance with the value of the pixel data Pxy, with the pixel data Pxy, thereby determines the binarization result Qxy.

9 Claims, 34 Drawing Sheets

| Pxy | N |
|-----|-----|
| 0 | 152 |
| 1 | 152 |
| 2 | 127 |
| 3 | 119 |
| 4 | 90 |
| 5 | 65 |
| 6 | 59 |
| 7 | 49 |
| 8 | 44 |
| 9 | 39 |
| 10 | 36 |
| 11 | 31 |
| 12 | 27 |
| 13 | 23 |
| 14 | 21 |
| 15 | 20 |
| 16 | 19 |
| 17 | 18 |
| 18 | 17 |
| 19 | 16 |

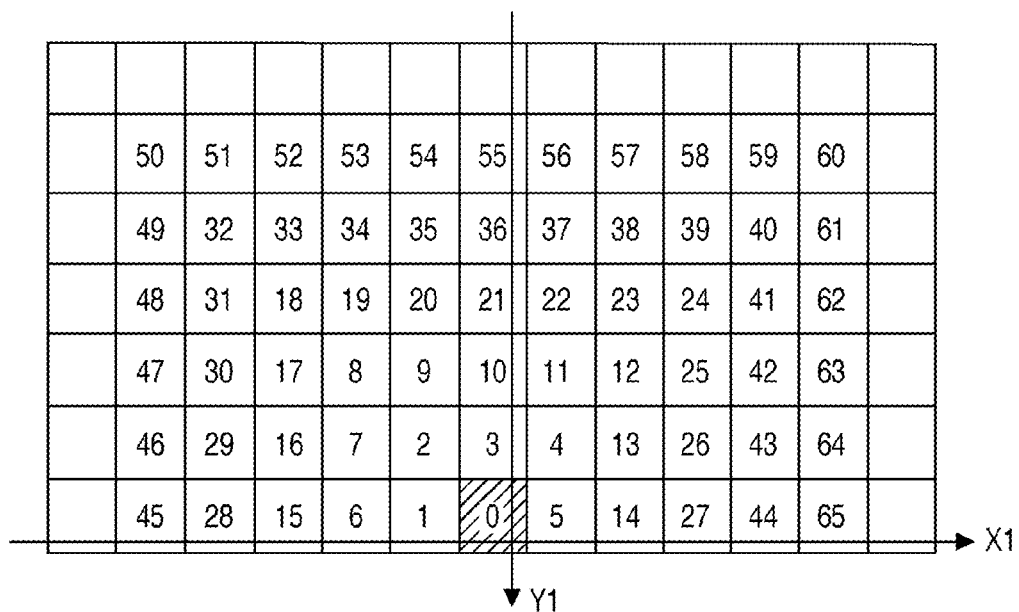
F I G. 21

FIG. 22

| No | X1 | Y1 |
|----|----|----|
| 0  | 0  | 0  |
| 1  | -1 | 0  |
| 2  | -1 | 1  |
| 3  | 0  | 1  |
| 4  | 1  | 1  |
| 5  | 1  | 0  |
| 6  | -2 | 0  |
| 7  | -2 | 1  |
| 8  | -2 | 2  |
| 9  | -1 | 2  |
| 10 | 0  | 2  |
| 11 | 1  | 2  |
| 12 | 2  | 2  |
| 13 | 2  | 1  |
| 14 | 2  | 0  |
| 15 | -3 | 0  |
| 16 | -3 | 1  |
| 17 | -3 | 2  |
| 18 | -3 | 3  |
| 19 | -3 | 3  |
| 20 | -3 | 3  |
| 21 | 0  | 3  |
| 22 | 1  | 3  |
| 23 | 2  | 3  |
| ⋮  | ⋮  | ⋮  |

FIG. 25

| No | Provious(i) |
|---|---|
| 0 | 5 |
| 1 | 0 |
| 2 | 3 |
| 3 | 4 |
| 4 | 13 |
| 5 | 14 |
| 6 | 1 |
| 7 | 2 |
| 8 | 9 |
| 9 | 10 |
| 10 | 11 |
| 11 | 12 |
| 12 | 25 |
| 13 | 26 |
| 14 | 27 |
| 15 | 6 |
| 16 | 7 |
| 17 | 8 |
| 18 | 19 |
| 19 | 20 |
| 20 | 21 |
| 21 | 22 |
| 22 | 23 |
| 23 | 24 |
| 24 | 41 |
| 25 | 42 |
| ⋮ | ⋮ |

INTERMEDIATE PORTION PROCESSOR

F I G. 38
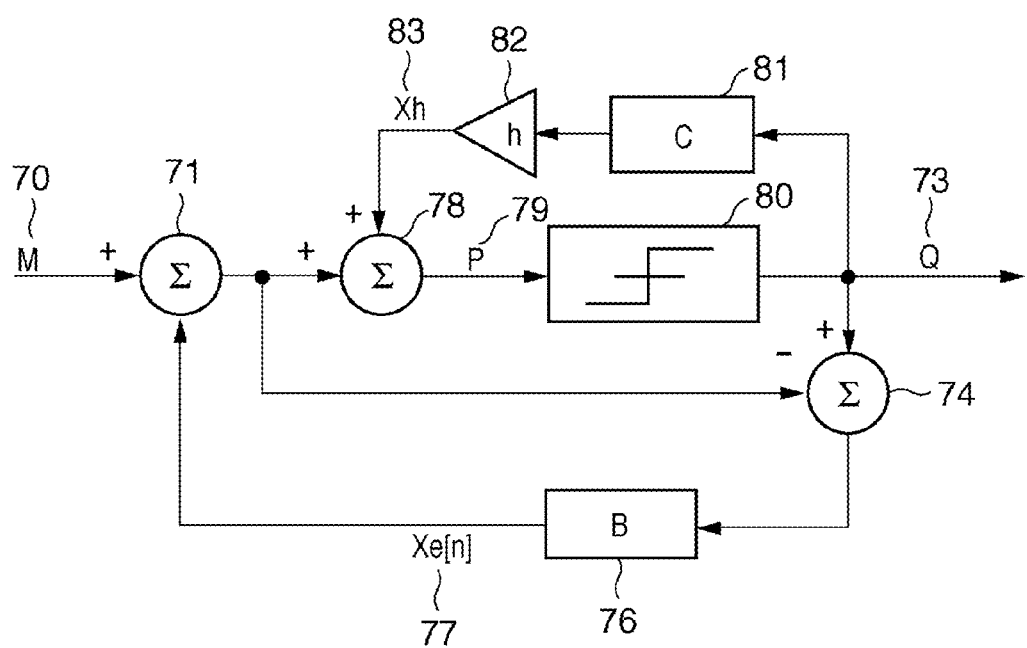

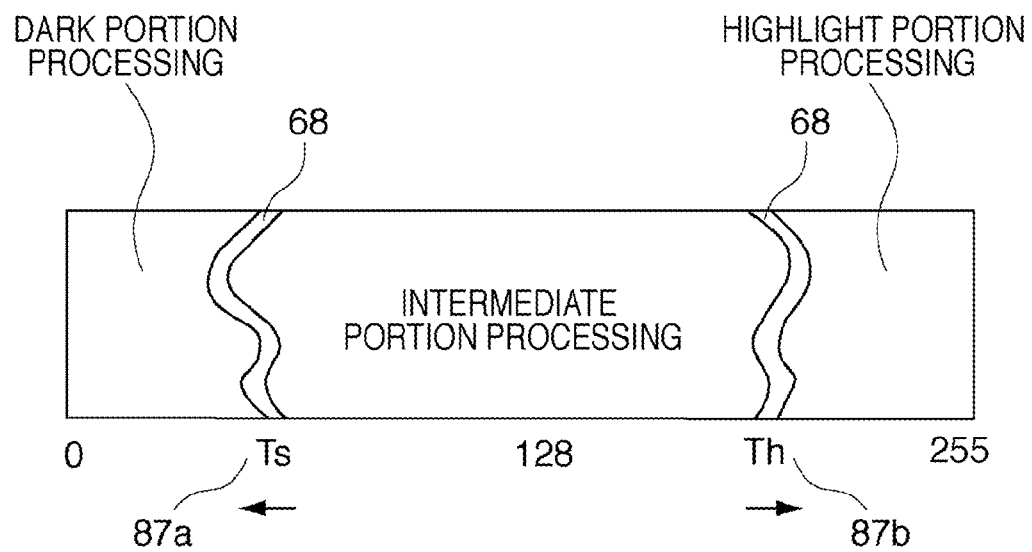

F I G. 45A
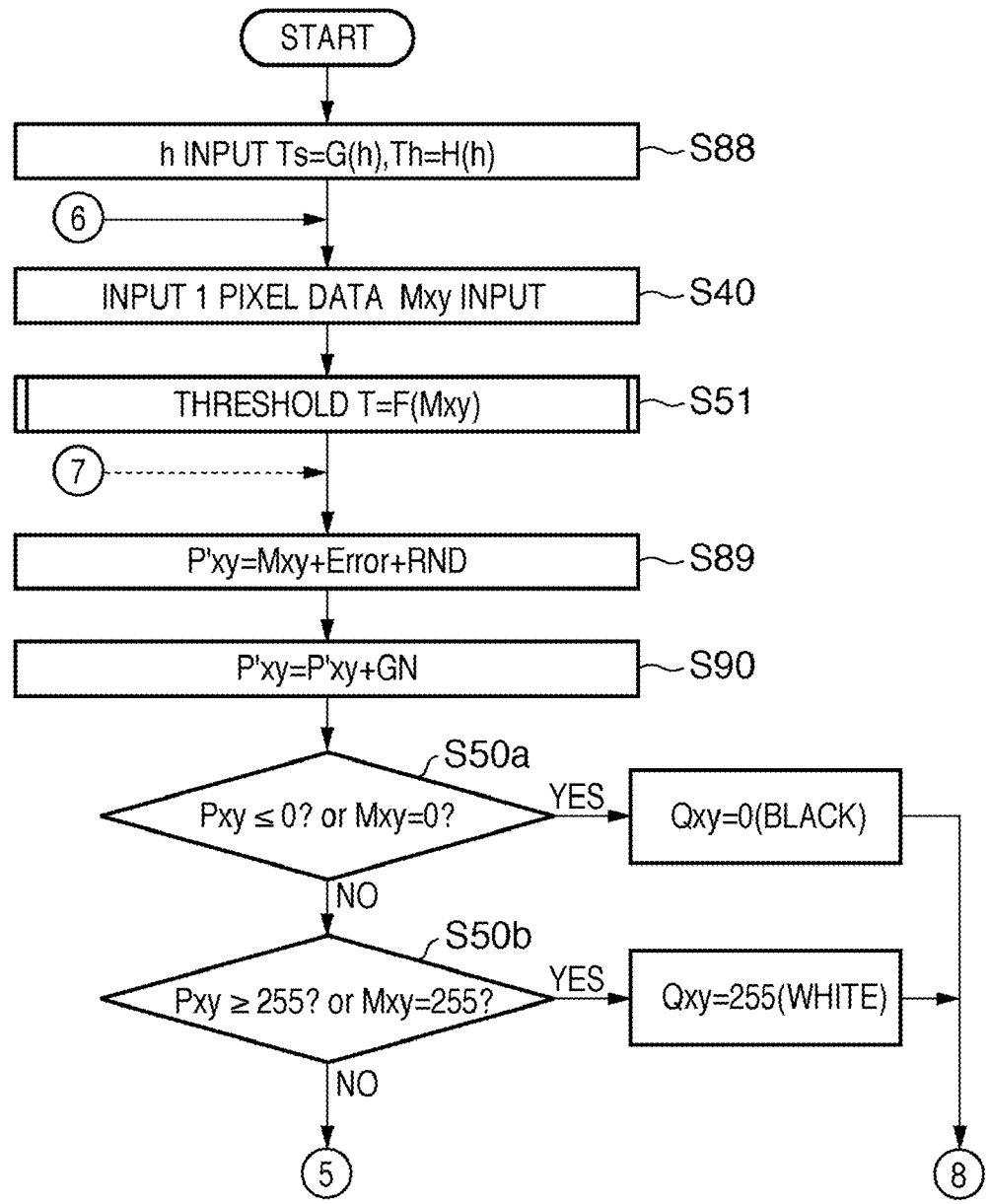

F I G. 48A
F I G. 48B
F I G. 48C
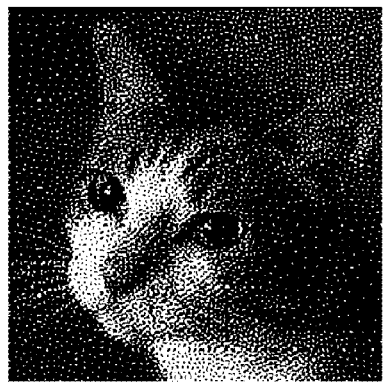

IMAGE PROCESSING APPARATUS AND CONTROL METHOD THEREOF FOR CONVERTING MULTILEVEL IMAGE DATA TO BINARY DATA USING AN ERROR DIFFUSION METHOD

BACKGROUND OF THE INVENTION

1. Field of the Invention

The present invention relates to an image data binarization technique, and more particularly, to an image binarization technique upon output to a printer incorporated in a digital copier, a multi-function apparatus or the like.

2. Description of the Related Art

Conventionally, as an image binarization technique used in an image output apparatus such as a printer, an error diffusion method is known. As characteristic features of the error diffusion method, the occurrence of moiré is prevented and gradation reproducibility is excellent. Further, in the error diffusion method, the texture structure is smaller in comparison with conventional systematic dithering and density pattern method, and the gradation is locally preserved. Accordingly, satisfactory image quality can be obtained in character and line art, and gradation images.

However, the error diffusion method has some problems. One of the problems is that there is a texture structure based on dot anisotropy in highlight and shadow portions. In such highlight and shadow portions, as the dispersion of black dots (or white dots) is poor and not isotropic, the black dots are arranged in uniflow manner, which degrades image quality. The occurrence of dot anisotropy depends on an error diffusion matrix. The dot anisotropy also occurs in a popularly-used error diffusion matrix by Floyd & Steinberg, which is comparatively simple and realized by a small hardware scale.

Another problem is a "sweep out texture phenomenon". This phenomenon occurs in an image with a drastic gradation change like black-to-white (or white-to-black) change, by delayed dot generation. The sweep out texture phenomenon is also referred to as a dot delay phenomenon (retardation). When this phenomenon occurs, pseudo outlines occur in highlight and shadow portions, which cause a serious problem in image quality. Especially in a CG image based on image data without noise component, the pseudo outlines are conspicuous.

These two problems particularly depend on the shape of the error diffusion matrix and contents of input image data. Accordingly, it is necessary to carefully select an error diffusion matrix. However, as described later, the "anisotropy phenomenon" and the "sweep out texture phenomenon" are in trade-off relation, and it is difficult to solve the both problems only by selection of error diffusion matrix.

As a solution to these problems, a method for forced dot determination without error diffusion matrix has been proposed (N. Karito: A Halftoning Method Using Circular Cell, NIHON GAZO GAKKAISHI, 46, 103-106 (2007))(Document 1). The Document 1 discloses obtaining an accumulated value of unbinarized neighboring image data of a current pixel, and obtaining the number of blacken dots and a cell size (1 halftone region). In this method, the obtained number of halftone lines can be controlled by controlling a search range, however, as a search is made through multi-bit unbinarized pixels, the capacity of an image memory is increased. Further, when a search is moved from a highlight portion to a shadow portion, a change from a black dot to a white dot cannot be made.

On the other hand, a Document 2, G. Marcu; "Error diffusion algorithm with output position constraints for homogeneous highlight and shadow dot distribution", Journal of Electronic Imaging, Vol. 9(1), pp 46-51, discloses searching for an already-binarized pixel in an image highlight and shadow portions, to detect presence/absence of dot in the neighborhood of a current pixel, and based on the result of detection, binarizing the current pixel. According to the technique disclosed in the Document 2, in comparison with the method in the above-described Document 1, the search is made for an already-binarized pixel, thereby a memory capacity only for a 1-bit plane is required. That is, the memory capacity is smaller. Further, in this method, as an error diffusion method is used in an intermediate portion between the highlight and shadow portions, the transition from a black dot to a white dot in the intermediate density portion can be smoothly performed by dot connection based on the error diffusion method.

However, in the Document 2, a change from a highlight portion to an intermediate portion or from an intermediate portion to a shadow portion cannot be smoothly made, and a pseudo outline occurs in the boundary. Further, the size of generated dots is fixed, which may not match various printer characteristics to be described later.

In a digital printing apparatus based on electrophotograpy, variations in special frequency in a print image cannot be handled due to a nonlinear characteristic of an electrophotographic process. This weak point comes from nonlinearity at an exposure process to diselectrify electric charge on the electronically-uniformly charged surface of an electrostatic drum of OPC, amorphous silicon or the like, by light beam scanning using laser or the like, and complexity of electrophotographic process including developing, transfer and fixing. For example, a minute 1 dot cannot be printed without difficulty, but actually a several dot-cluster can be printed. Dots existing with a minute distance therebetween are attached or moved away by toner movement due to the distance.

In this situation, in a so-called disperse type method in an FM halftone screen, high image quality cannot be obtained in the electrophotographic printing without difficulty, while in a cluster type method for dot concentration, stable gradation reproducibility can be achieved.

SUMMARY OF THE INVENTION

The present invention provides a technique to solve the "anisotropy phenomenon" and the "sweep out texture phenomenon" which occurs in binarization processing of multi-level image data. Further, the present invention provides a technique to control a dot cluster size and obtain a high quality image output in electrophotographic printing. Further, the present invention provides a technique to maintain high image quality in CG images which are recently popularly used.

According to an aspect of the present invention, provided is an image processing apparatus for converting multi-level image data to binary image data using an error diffusion method, comprising: an update unit configured to add an error, diffused to a position of multi-level pixel data as a subject of binarization, to the pixel data, and thereby update the pixel data; a determiner configured to determine whether current pixel data belongs to a highlight portion, a dark portion or an intermediate portion, by comparing a value of the current pixel data updated by the update unit with predetermined threshold values Ts and Th; a highlight portion processor configured to, when the determiner determines that the current pixel data belongs to the highlight portion, refer to already-binarized results in a range determined in accordance with the value of the current pixel data, and determine a value of binary pixel data corresponding to the current pixel data; a dark portion processor configured to, when the determiner determines that the current pixel data belongs to the dark portion, refer to the already-binarized results in the range determined in accordance with the value of the current pixel data, and determine the value of the binary pixel data corresponding to the current pixel data; an intermediate portion processor configured to, when the determiner determines that the current pixel data belongs to the intermediate portion, compare a threshold value T monotonously increasing in accordance with the value of the current pixel data with the value of the current pixel data, thereby determining the value of the binary pixel data corresponding to the current pixel data; and a diffuser configured to diffuse a difference between the value of the current pixel data and the value of the binary pixel data determined by the highlight portion processor, the dark portion processor or the intermediate portion processor, to unbinarized pixel positions in the neighborhood of the pixel position of the current pixel data.

According to the present invention, an image processing apparatus capable of outputting a high quality cluster type FM halftone image without "anisotropy" or "sweep out texture" phenomenon. Further, it is possible to generate a cluster dot corresponding to individual MTF characteristics of an electrophotographic printing apparatus and enable stable image output.

Further features of the present invention will become apparent from the following description of exemplary embodiments with reference to the attached drawings.

BRIEF DESCRIPTION OF THE DRAWINGS

FIG. 21 is an explanatory view of a pixel search order;

FIG. 22 is an example of a table holding relative addresses in the pixel search;

FIG. 25 is an example of a table for the differential pixel search;

FIG. 38 is a block diagram showing the binarization processing unit using a green noise method;

FIGS. 42A and 42B are examples of coefficients added to the reference pixel in the green noise method;

FIG. 43 is an explanatory view of division of luminance area by the green noise method and the boundary;

FIGS. 45A and 45B are flowcharts showing the details of the binarization processing according to the second embodiment;

FIGS. 48A to 48C are examples of an output in the green noise method with the gain coefficient h=0 based on the error diffusion method by Floyd & Steinberg, an output in the green noise method with the gain coefficient h=0.5 based on the error diffusion method by Floyd & Steinberg, and an output in the green noise method with the gain coefficient h=0.2 based on the error diffusion method by Jarvis.

DESCRIPTION OF THE EMBODIMENTS

Hereinbelow, preferred embodiments of the present invention will be described in detail in accordance with the attached drawings.

[First Embodiment]

Figure 1:
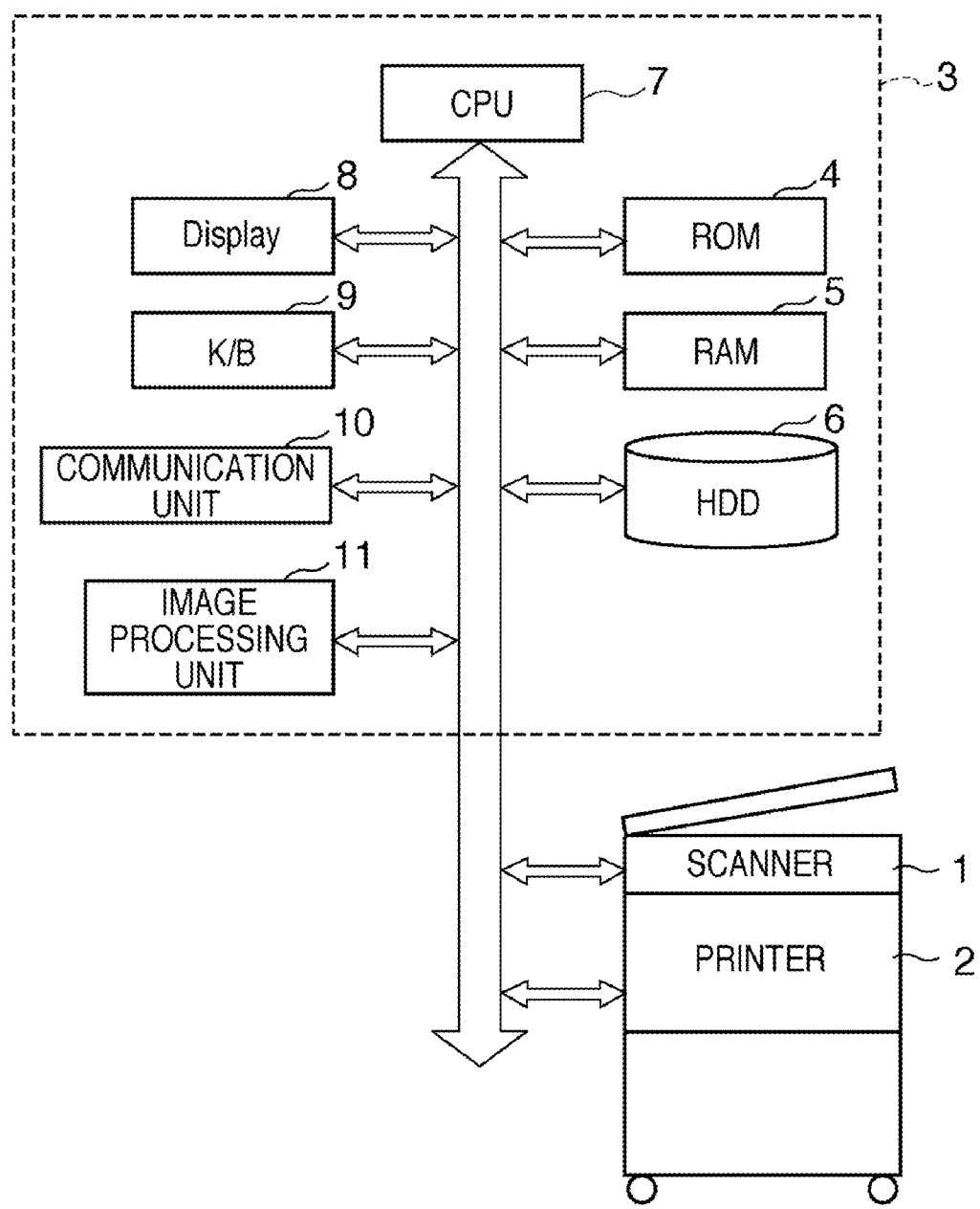
FIG. 1 is a block diagram showing an image processing apparatus to which a first embodiment is applied.

FIG. 1 is a block diagram of a multifunction peripheral (MFP) in the embodiment. In FIG. 1, a controller 3 which is provided in the MFP as a circuit board is illustrated outside the MFP for the sake of convenience. The present apparatus has a scanner 1 as a reading unit to read an original and a printer 2 as a printing unit, and the controller 3 controls these units. The controller 3 has a ROM 4, a RAM 5, an HDD 6 as a storage unit to hold a program memory and function as an image data buffer, a display 8 typified by a liquid crystal display, and a keyboard 9. Further, the controller 3 has a communication unit 10 for communication with a network and an image processing unit 11 to perform binarization on image data and output the binarized data to the printer 2. A CPU 7 of the controller 3 reads a program stored in the HDD 6 to the RAM 5 and executes the program thereby controls the above-described respective constituent elements. Note that as the printer 2 in the present embodiment, a monochromatic laser beam printer is employed. Further, each pixel of multi-level image data as the subject of printing in the embodiment indicates a luminance (or brightness) value in 8-bit (256 levels) representation.

Figure 2:
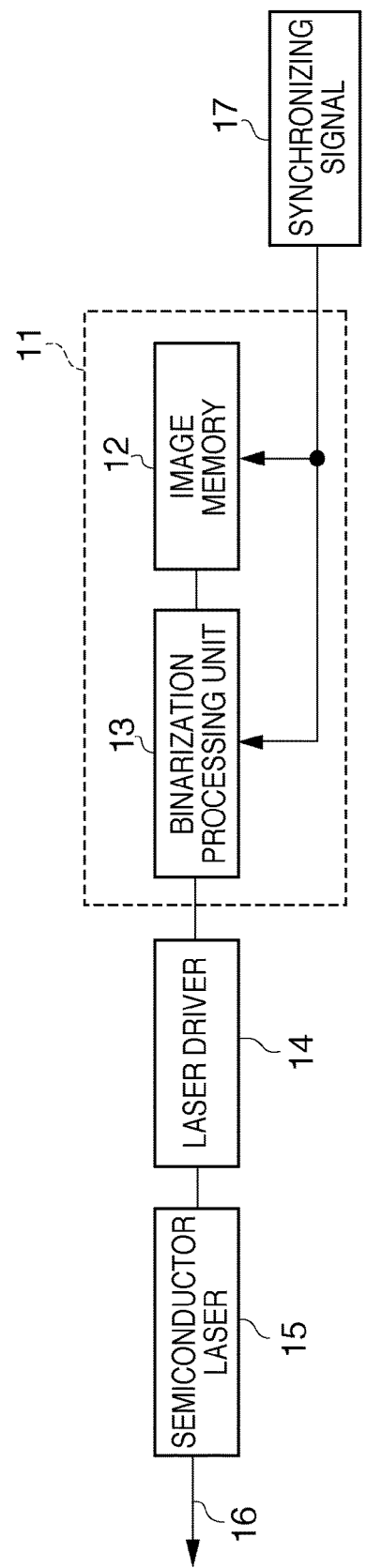
FIG. 2 is a block diagram showing a configuration of an image processing unit.

FIG. 2 is a block diagram mainly showing the configuration of the image processing unit 11. A horizontal-vertical synchronizing signal 17 from the printer 2 includes H-Sync and V-Sync signals of an output raster image and a pixel clock. Multi-level image data typified by CG image data, stored in the RAM 5 or the HDD 6, is transferred to the image memory 12 in the image processing unit 11. Then, a binarization processing unit 13 performs binarization processing on the multi-level image data stored in the image memory 12, and outputs the binarized image data to a laser driver 14. The laser driver 14 drives a semiconductor laser 15 based on the input binary image data. As a result, a beam-modulated modulation beam 16 is emitted from the semiconductor laser 15. Though the modulation beam is not shown, it is introduced to a printing apparatus based on an electrophotographic technique, and image-outputted through exposure→development→transfer→fixing electrophotographic process.

Prior to the explanation of the binarization processing unit 13 in the present embodiment, the binarization processing utilizing a general error diffusion method will be described.

Figure 3:
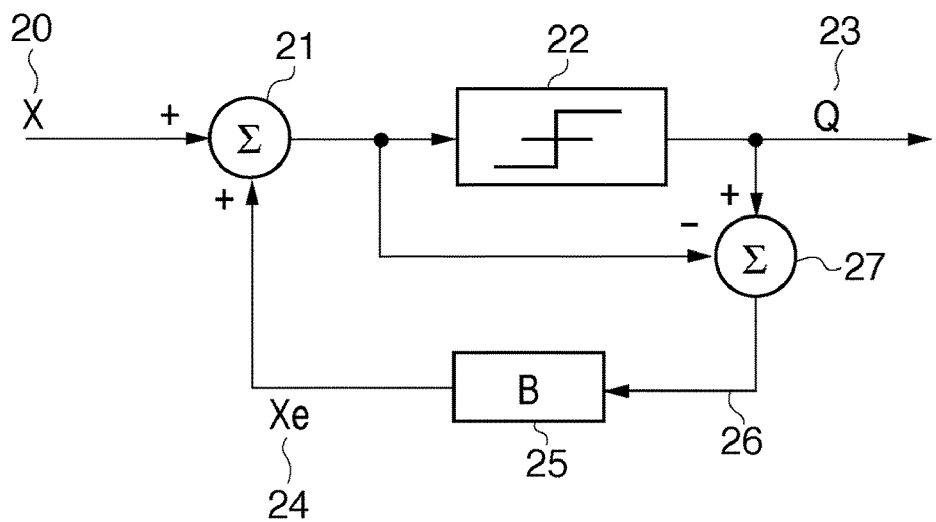
FIG. 3 is a block diagram showing a configuration for binarization processing according to a general error diffusion method.

FIG. 3 shows a circuitry utilizing the error diffusion method. A current pixel X20 as input multi-level pixel data is binarized by a binarization processing circuit 22, and as a result of binarization, binary pixel data Q23 is obtained. At this time, an error caused by the binarization is obtained as error data Ye26 by an error detector 27, and the error is diffused in correspondence with an error diffusion matrix unit B25. The error to be diffused is diffused to plural unbinarized pixels (pixels to be binarized). Accordingly, the error diffusion matrix unit B25 includes a buffer memory for several lines.

Figure 4:
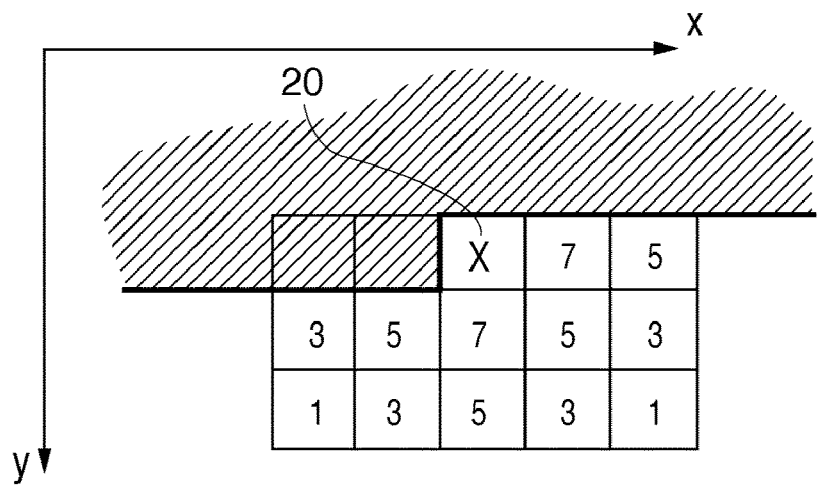
FIG. 4 illustrates the relation among a current pixel, an error-diffused unbinarized image position, and a diffused value in the error diffusion method.

In FIG. 4, the x-direction corresponds to a main-scanning direction, and the y-direction, a subscanning direction, in recording. The upper portion (hatched portion) and the leftward direction from the current pixel X are already-binarized pixel (binarized pixel) regions, and the lower portion and the right side portions, unbinarized pixel regions. Error data Xe24, already binarized and diffused to the position of the current pixel X, is added to (when negative, subtracted from) the input pixel data X20 by an adder 21, and updated as new pixel data. The updated pixel data is compared with a predetermined threshold value T and binarized by the binarization processing circuit 22. That is, an error distribution value Xe obtained by error diffusion is added to a value X of the input pixel data X20, and as a result, a value Xk is obtained.

$$Xk=X+Xe \quad (1)$$

The binarization processing circuit 22 compares the updated pixel value Xk with the threshold value T, and obtains binarized output data Q as follows.

When $Xk \geq T$ holds, Q=255

When $Xk < T$ holds, Q=0 \quad (2)

Note that when the pixel data is in 8-bit representation, as the threshold value T, generally an intermediate value "128" in 8-bit representation is employed. Further, in this example, the result of binarization is "0" or "255", however, when normalized, the result may be "0" or "1".

Figure 5A:
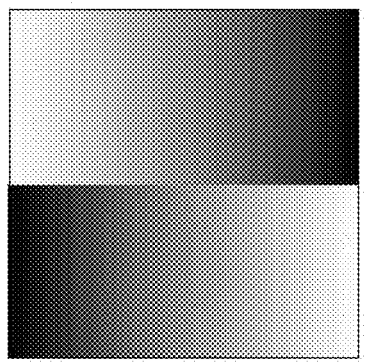
FIGS. 5A and 5B are examples of a gray scale image and an output image by error diffusion method corresponding to the gray scale image.
Figure 7A:
FIGS. 7A and 7B are examples of a natural picture and an output image by the error diffusion method corresponding to the natural picture.

FIGS. 5A and 5B to FIGS. 7A and 7B show image output examples by the error diffusion method. FIG. 5A shows a gray scale image; FIG. 6A, a CG image where the image data has luminance values "248", "8" and "234"; and FIG. 7A, a natural picture. Based on these images as input images, FIGS. 5B, 6B and 7B respectively corresponding to FIGS. 5A, 6A and 7A show outputs by the error diffusion method. Note that an error diffusion matrix used here is the following matrix by Floyd & Steinberg. In the matrix, the alphabet X indicates a current pixel.

$$\frac{1}{16}\begin{pmatrix} \cdot & X & 7 \\ 3 & 5 & 1 \end{pmatrix}$$

Figure 5B:
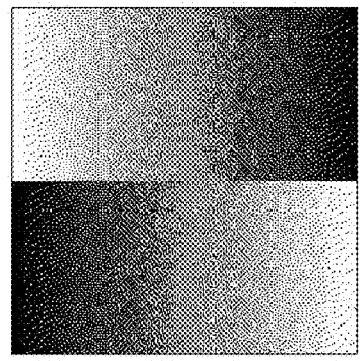
Figure 6A:
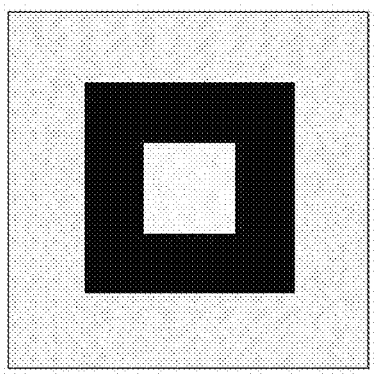
FIGS. 6A and 6B are examples of a CG image and an output image by the error diffusion method corresponding to the CG image.
Figure 6B:
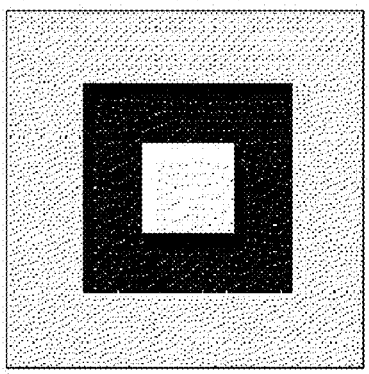
Figure 7B:

As it is understood from FIG. 5B, in highlight and shadow portions, dots are flown and dot "anisotropy" occurs. Further, as it is understood from FIG. 6B, in a portion where the image density is radically changed, dot delay occurs and the "sweep out texture phenomenon" occurs. This phenomenon is further conspicuous (not shown) when an error diffusion matrix by Jarvis with a wide diffusion area is used. It is understood from FIG. 7B showing the natural picture output that these phenomena cause a pseudo outline which degrades the image quality.

The problems in the general error diffusion method are as described above.

Figure 8:
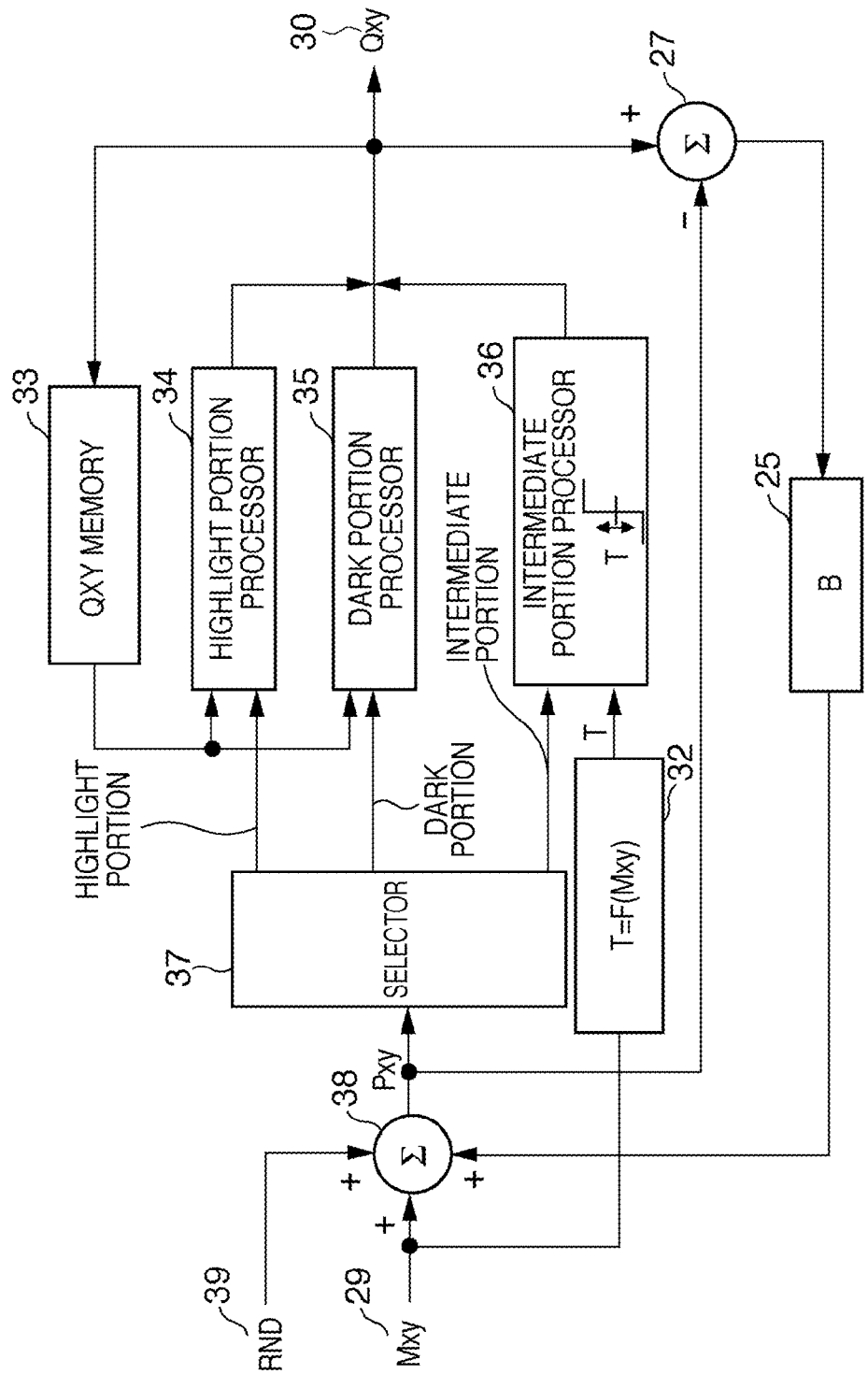
FIG. 8 is a block diagram showing the binarization processing unit according to a first embodiment of the present invention.

Next, the binarization processing unit 13 in the present embodiment will be described. FIG. 8 is a block diagram of the binarization processing unit 13.

An adder 38 adds data of current pixel Mxy(29) in a position (x,y) of an image inputted in raster-scanning order, a value RND(39) from a random number generator to generate a random number within a constant amplitude, and an error diffused to the position of the current pixel from the position of a binarized pixel neighborhood of the current pixel. As a result, the current pixel is updated as Pxy, and supplied to a selector 37.

Note that as the data Mxy is raw input pixel data and the data Pxy is pixel data to which error information and random number value are added, the data Mxy is distinguished from the data Pxy. The selector 37 determines by the following condition expressions (4) whether the input pixel data Pxy belongs to one of three regions, i.e. a highlight portion, an intermediate portion or a dark portion, and outputs the pixel data to one of a highlight portion processor 34, a dark portion processor 35 and an intermediate portion processor 36.

When Pxy<Ts holds, the selector 37 outputs the pixel data Pxy to the dark portion processor 35.

When Ts≦Pxy<Th holds, the selector 37 outputs the pixel data Pxy to the intermediate portion processor 36.

When Th≦Pxy holds, the selector 37 outputs the pixel data Pxy to the highlight portion processor 34. (4)

Note that Ts<Th holds as the relation between the threshold values Ts and Th. These threshold values are used for determination of the shadow and highlight portions.

A threshold value setting unit 32 calculates the threshold value T for binarization processing depending on the value Mxy of input pixel data in accordance with a function f( ) and sets the calculated threshold value (the details will be described later).

$$T=f(Mxy) \quad (5)$$

The intermediate portion processor 36 compares the calculated threshold value T with the input pixel data Pxy thereby performs binarization processing, and outputs a binarization result Qxy30.

On the other hand, the highlight portion processor 34 and the dark portion processor 35 refer to a Qxy memory 33 holding the result of binarization of the input pixel data Pxy, binarize the input data Pxy, and output the binarization result as the result Qxy30. At this time, the binarization result Qxy30 is stored in the Qxy memory 33, and an error is calculated by the error detector 27. The calculated error is diffused to unbinarized pixel positions by the error diffusion matrix 25.

Figure 9:
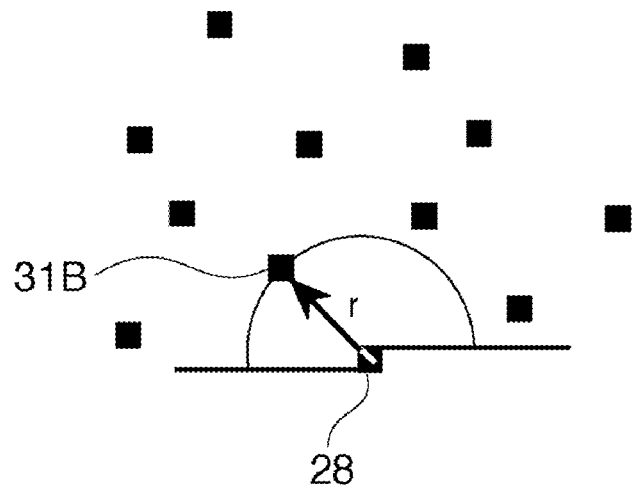
FIG. 9 is an explanatory view of a pixel search method in a highlight portion according to the first embodiment.

Next, the processing by the highlight portion processor 34 will be described using FIG. 9. It is presumed that image data is 8-bit luminance data, "0" is black, and "255", white. In the processing, it is determined whether or not a distance r from a current pixel 28 to a black pixel 31B in the nearest position from the current pixel 28 among already-binarized pixels in the neighborhood of the current pixel 28 is within a predetermined distance obtained from pixel data of the current pixel 28. That is, assuming that the predetermined distance obtained from the image data Pxy of the current pixel 28 is r0 and the distance between the current pixel 28 and the nearest black pixel 31B is r, the binarization result Qxy is determined by the following condition expressions (6).

When r<r0 holds, Qxy=255

When r≧0 holds, Qxy=0 (6)

Note that $r=SQRT\{(x1-x)^2+(y1-y)^2\}$ (7)

The values x1 and y1 indicate coordinates of the nearest black pixel of the current pixel 28. The values x and y are coordinates of the current pixel 28.

Further, X^y is a function indicating y-power of X, and SQRT{ }, a function indicating a square root. Note that as long as the relation between the two distances can be determined, it is not necessary to obtain the square root. Further, the details of the determination of r0 will be described later.

Figure 10:
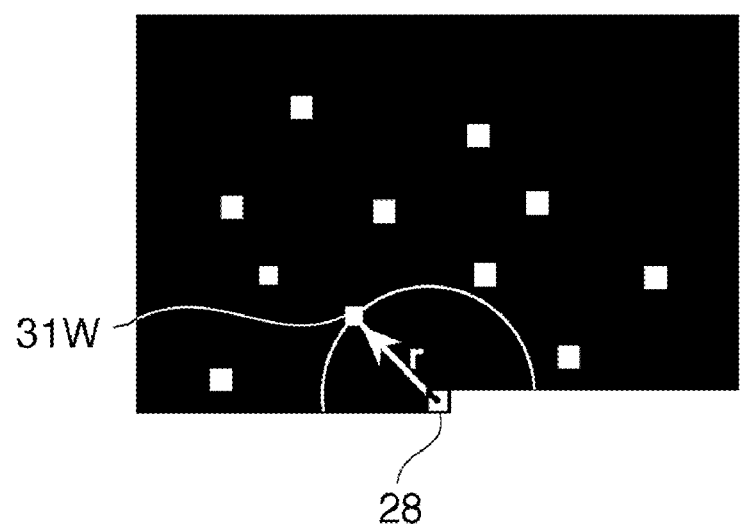
FIG. 10 is an explanatory view of a pixel search method in a dark portion according to the first embodiment.

Next, the processing by the dark portion processor 35 will be described using FIG. 10. The dark portion processor 35 makes a search for a white dot (pixel having the value "255") in the already-binarized pixel region in an inverse manner to that of the highlight portion processor 34.

Then, it is determined whether or not the distance r from a white pixel 31W in the nearest position from the current pixel 28 among already-binarized pixels in the neighborhood of the current pixel 28 is within a predetermined distance obtained from the pixel data of the current pixel 28. Then as in the case of the highlight portion processor, the output is determined by the following condition expressions.

When r<r0 holds, Qxy=0

When r≧r0 holds, Qyx=255 (8)

When the binarized data Qxy is obtained as described above, the binarized data Qxy is stored in the memory 33, and referred to upon the next pixel binarization.

Figure 11:
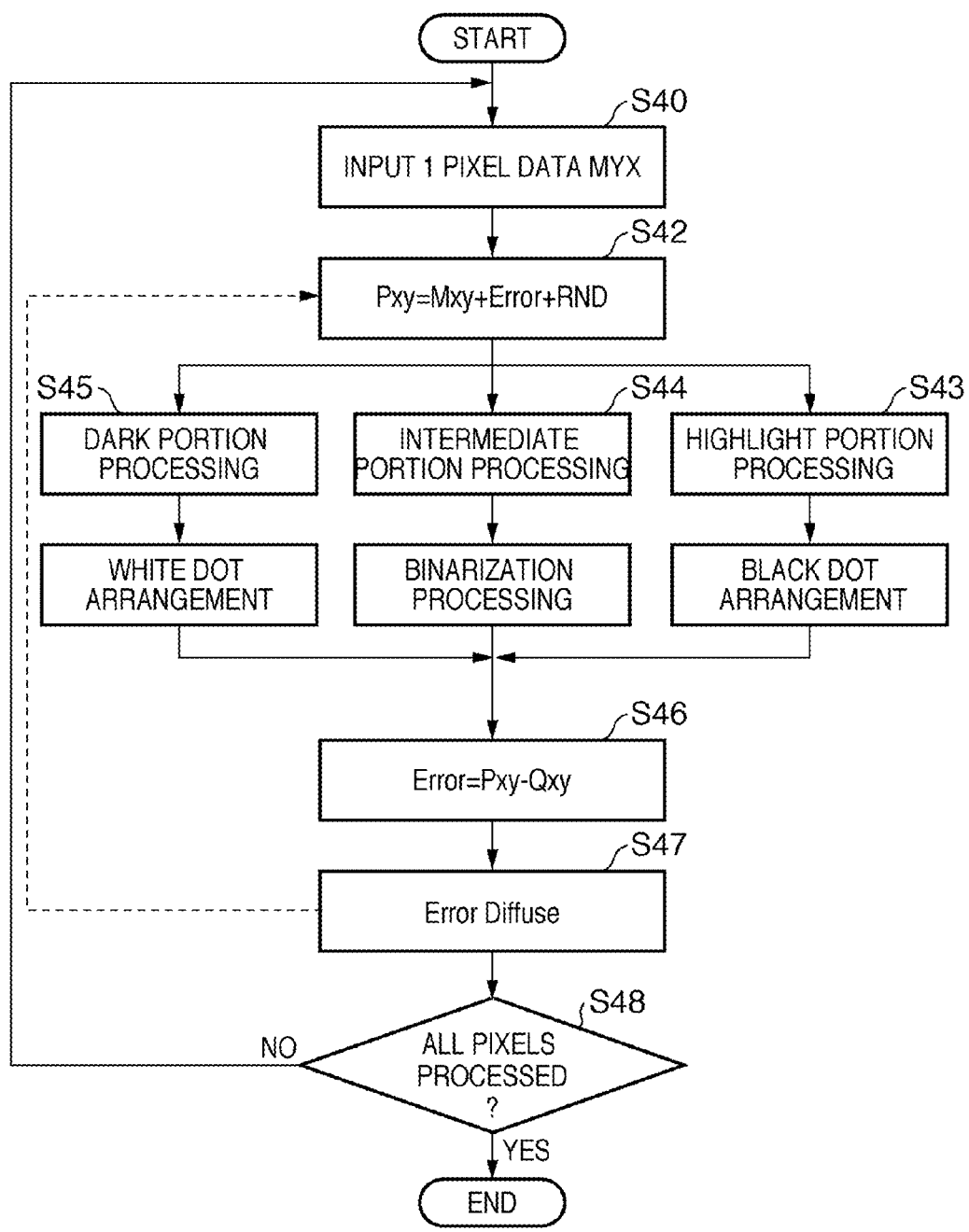
FIG. 11 is a flowchart showing a procedure of binarization processing according to the first embodiment.

The above processing will be described with reference to the flowchart of FIG. 11.

First, the binarization processing unit 13 reads pixel data Mxy positioned in the coordinates (x,y) (step S40).

Next, error data and a random number value are added to the input pixel data (current pixel data), thereby the current pixel data Mxy is updated to Pxy (step S42). Then, the binarization processing unit 13 performs one of highlight portion processing (step S43), intermediate portion processing (step S44) and dark portion processing (step S45) in accordance with the value of the updated current pixel data Pxy, and obtains output binarized data Qxy. Then the binarization processing unit 13 calculates an error between the input value Pxy and the binarization result Qxy (step S46), and diffuses the error to unbinarized pixel positions in accordance with the error distribution matrix (step S47). Then this processing is repeated until it is determined in step S48 that the processing for all the pixel data has been performed.

Figure 12:
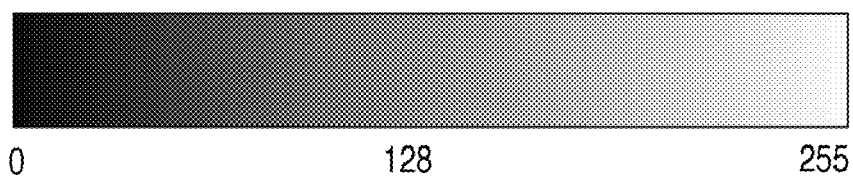
FIG. 12 illustrates a gray scale image.

FIG. 12 shows a sample of 8-bit continuous-tone gray scale image. The value of a black pixel is "0", while the value of a white pixel, "255".

Figure 13:
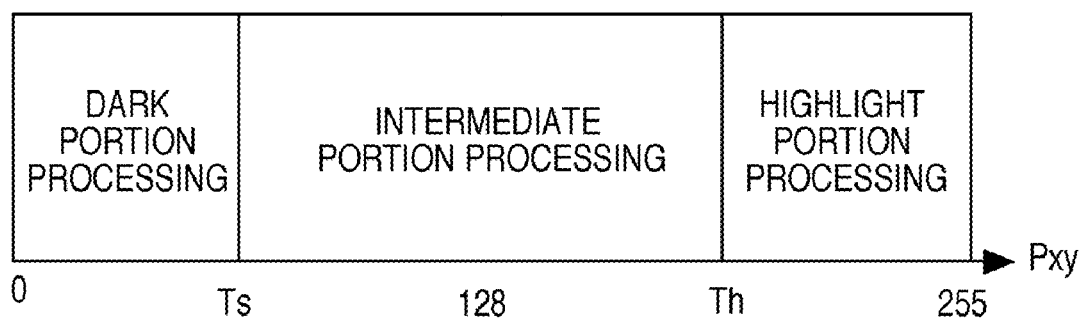
FIG. 13 is an explanatory view of an example of dividing in the binarization processing.

FIG. 13 shows regions of a highlight portion, an intermediate portion and a dark portion determined for the sample image in FIG. 12 in accordance with the above-described threshold values Ts and Th. Regarding the image data Pxy to which error data and the like are added, the pixel value in the dark portion is "0" to "Ts"; in the highlight portion, "Th" to "255"; and in the intermediate portion, "Ts" to "Th".

Figure 14A:
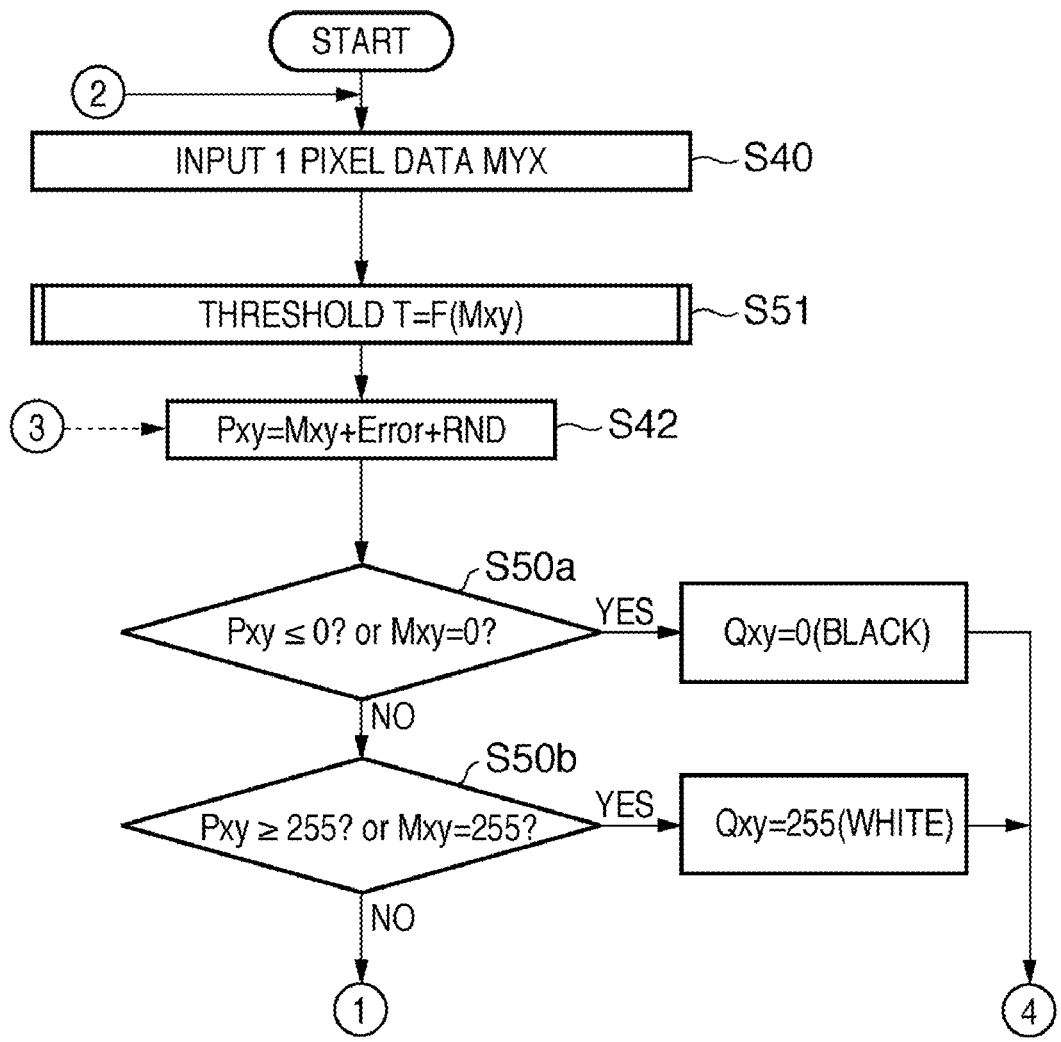
FIGS. 14A and 14B are flowcharts showing the details of the binarization processing according to the first embodiment.
Figure 14B:
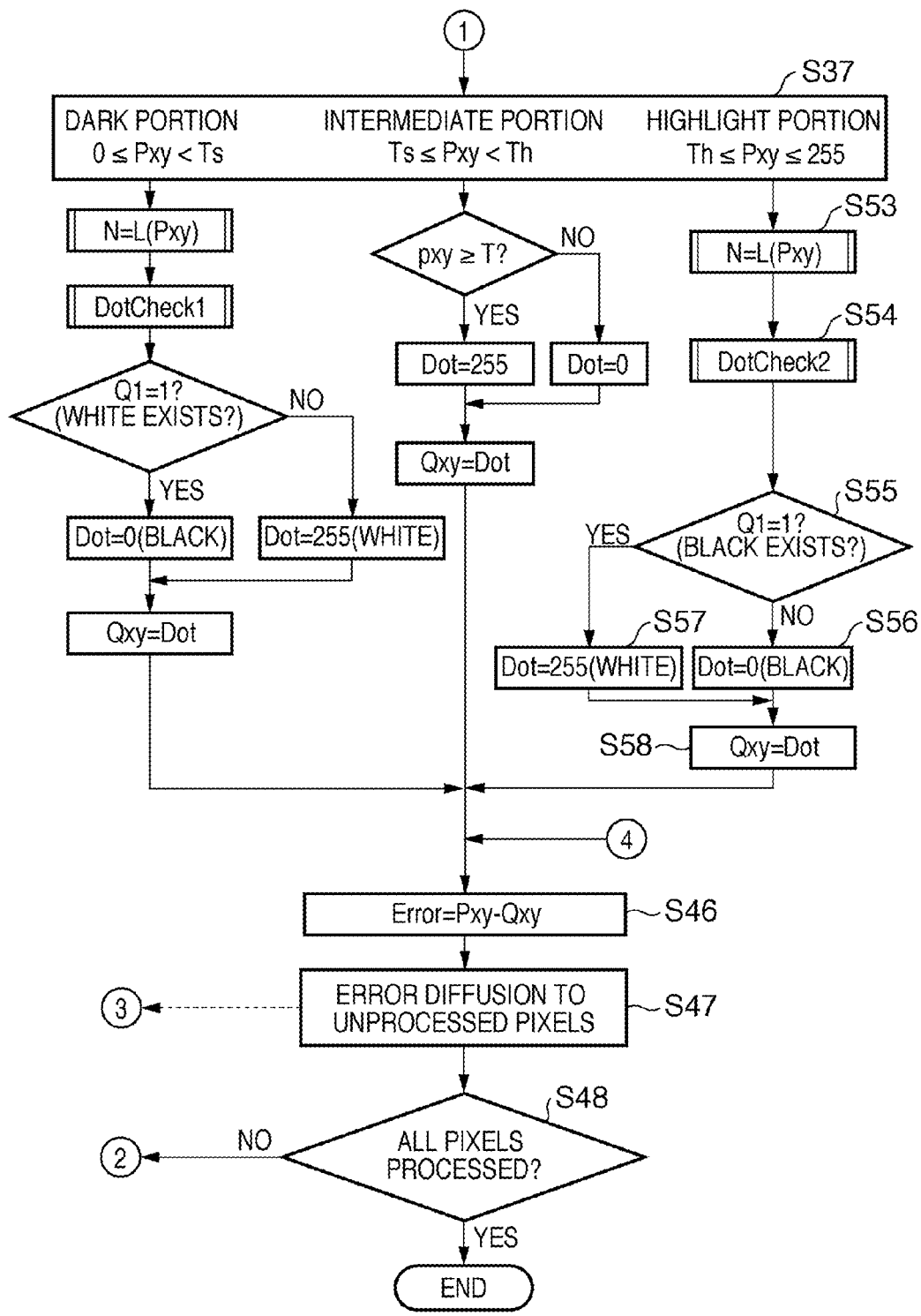

FIGS. 14A and 14B are flowcharts showing a more detailed process procedure in the binarization processing unit 13 according to the present embodiment.

First, the binarization processing unit 13 inputs one pixel data Mxy in step S40. Then in step S51, the binarization processing unit 13 calculates the threshold value T(=F(xy)) in the intermediate portion, and in step S42, an error and a random number are added to the input pixel data Pxy, thereby updated pixel data Pxy is calculated. Then, in steps S50*a* and S50*b*, it is determined whether or not the updated pixel data Pxy satisfies the following condition. When it is determined that the updated pixel data Pxy satisfies the condition, a binarization result Qxy is outputted.

When Pxy≦0 or Mxy=0 holds, Qxy=0

When Pxy≧255 or Mxy=255 holds, Qxy=255 (9)

Then, when it is determined that the updated pixel data Pxy does not satisfy the condition, the binarization processing unit 13 performs processing in the dark portion, the highlight portion and the intermediate portion in correspondence with the value of the updated pixel data Pxy.

First, when (Ts≦Pxy<Th) holds in the intermediate portion, the binarization result Qxy is determined from the updated pixel data Pxy using the threshold value T obtained in step S51 as follows.

When Pxy≧T holds, Qxy=255

When Pxy<T holds, Qxy=0 (10)

Next, the processings in the highlight portion and the dark portion will be described in detail.

As the difference between the processings in the highlight portion and the dark portion is whether a pixel to be searched is a black pixel (the binarization result is "0") or a white pixel (the binarization result is "255"), in the following explanation, the processing in the highlight portion will be described.

In the binarization processing in the highlight portion, the binarization processing unit 13 determines the relation between the distance r from the current pixel data Pxy to a nearest black pixel and the distance r0 determined depending on the current pixel data Pxy. In other words, a search is made for determining whether or not a black pixel exists within the distance r0 determined depending on the current pixel data Pxy. Accordingly, a search range N is determined in accordance with the current pixel data Pxy.

$$N = L(Pxy) \quad (11)$$

Note that the value of the search range N physically indicates a distance from the current pixel, however, it is converted to the number of pixels to be searched with the current pixel as a central position for the sake of convenience of calculation, so as to widen the distance (the details will be described later).

Then, in dot check processing in step S54, the binarization processing unit 13 refers to the Qxy memory 33 and sequentially searches pixels within the already-binarized region, up to a maximum number N of pixels. Then, in step S55, during the search up to the maximum number of pixels N, it is determined whether a black pixel (a white pixel in the dark portion) exists. When it is determined during the search up to the maximum number of pixels N that a black pixel (a white pixel in the dark portion) exists, as a black pixel already exists in the neighborhood of the current pixel, the value of Qxy is set to "255 (white pixel)" not to set a black pixel in the position of the current pixel (step S57). Further, when it is determined during the search up to the maximum number of pixels N that no black pixel exists, the binarization result Qxy of the current pixel is set to "0 (black pixel)" (step S56). Then in step S58, the determined binarization result Qxy is outputted.

Thereafter, in step S46, the binarization processing unit 13 calculates a difference between the binarization result Qxy and the input pixel data Pxy as error data Error, and diffuses the error data to neighboring unbinarized pixels as in the case of the general error diffusion method (step S47). Then this processing is repeated until it is determined in step S48 that the processing for all the pixels has been performed.

The above-described processing is performed in the highlight portion, however, the same processing is performed in the dark portion except that the subject of search in the dark portion is a white pixel as easily understood from the above description. Accordingly, the explanation of the processing in the dark portion will be omitted.

Next, the function L( ) in the expression (11) will be described using FIG. 15.

In the present embodiment, each pixel of image data is luminance data. In the case of the dark portion processing, from a status where the entire region is all black (luminance=0), when the result of addition of accumulated error is a predetermined value, a white dot is placed. Assuming that regarding the input pixel data value Pxy, the neighboring pixel value is the same as that of the pixel data Pxy and when one white dot is placed in N pixels, the following relation is held.

$$N = 255/Pxy \quad (12)$$

Further, in the expression (12), as N→∞ holds in the pixel data Pxy, the expression (11) is determined as follows.
When Pxy≠0 holds:

If Int(255/Pxy)>Nmax then N=Nmax else N=Int(255/Pxy)

Otherwise, When Pxy=0 holds:

N=Nmax (13)

Note that Int( ) means a function for conversion to obtain an integer.

Figures 15, 16:
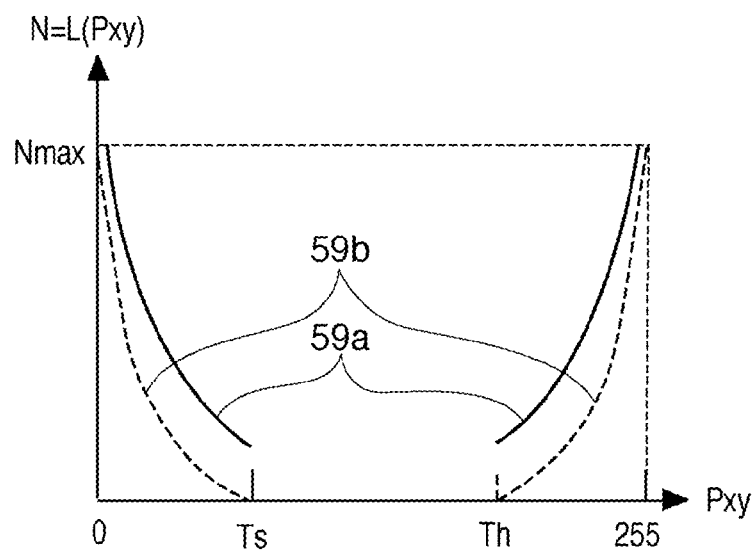
FIG. 15 is a line graph showing the relation between the numbers of searched pixels corresponding to luminance values in the highlight and dark portions, according to the present embodiment.
FIG. 16 is an example of a table holding the numbers of searched pixels.

In FIG. 15, a curve 59*a* is obtained by plotting the expression (13) which monotonically decreases in a region where 0≦Pxy<Ts holds. Similarly, on the highlight side, a symmetrical curve can be given in a region where Th<Pxy≦255 holds.

Numeral 59*b* denotes a quadratic curve. In a pixel value section [0,Ts], when the pixel value is "0", N=Nmax holds and when the pixel value is Ts, N=0 holds, the relation is defined with the following function.

$$N = Nmax \times (Pxy - Ts)^2 / Ts^2 \quad (14)$$

Note that X^Y indicates a Y-power of X.

Such function represents a dot dispersion density in the highlight and shadow portions.
Accordingly, a large N value with respect to Pxy gives a wider 1-dot area. Accordingly, by changing this function, the gradation characteristic in the highlight and shadow portions can be controlled.

FIG. 16 is a look-up table showing the N values with respect to the pixel data Pxy to provide an arbitrary nonlinear curve. The respective values are stored in a table memory when 0≦Pxy≦255 holds, thereby the N value can be easily obtained.

Figure 17:
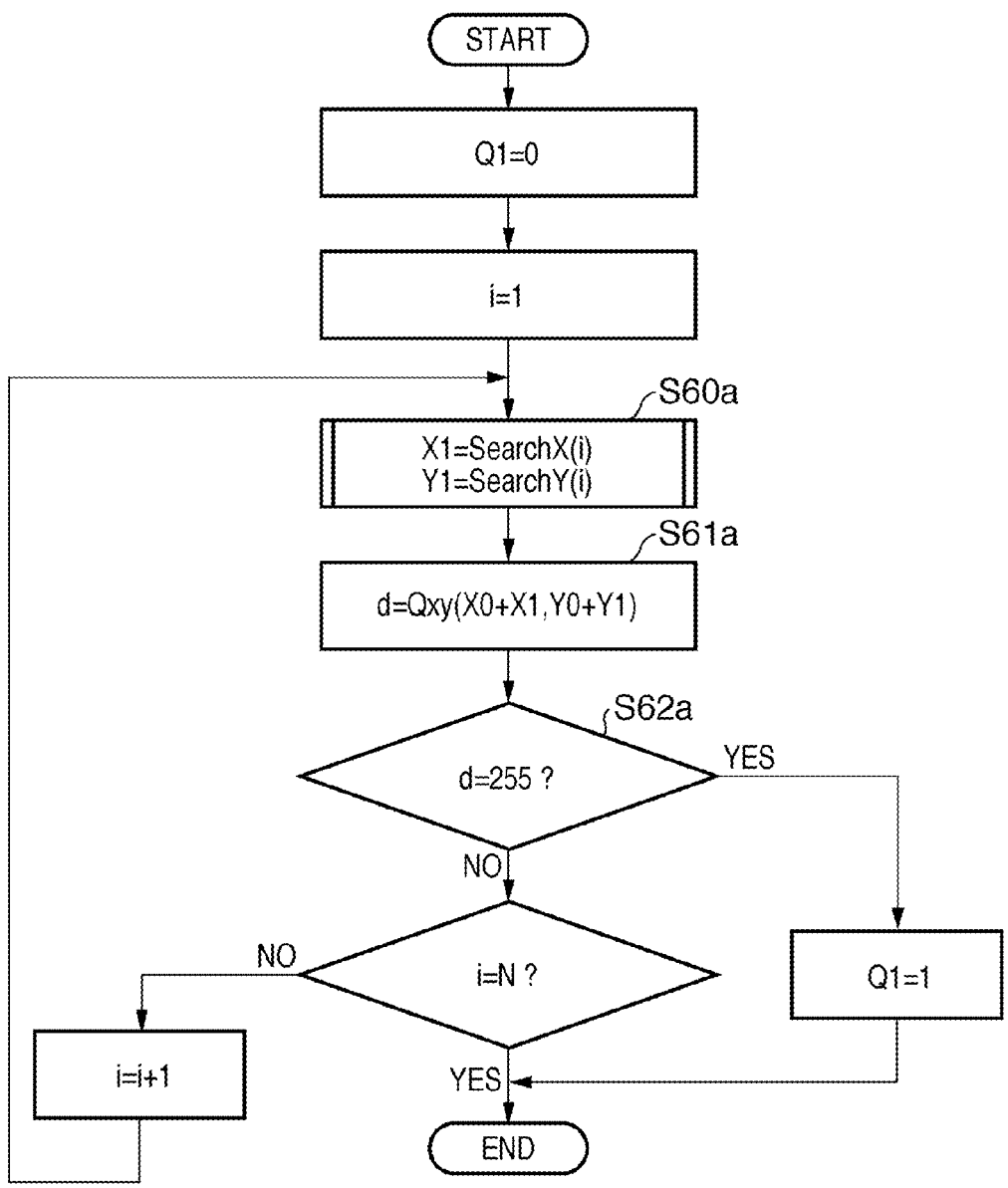
FIG. 17 is a flowchart showing the search processing in the dark portion.
Figure 18:
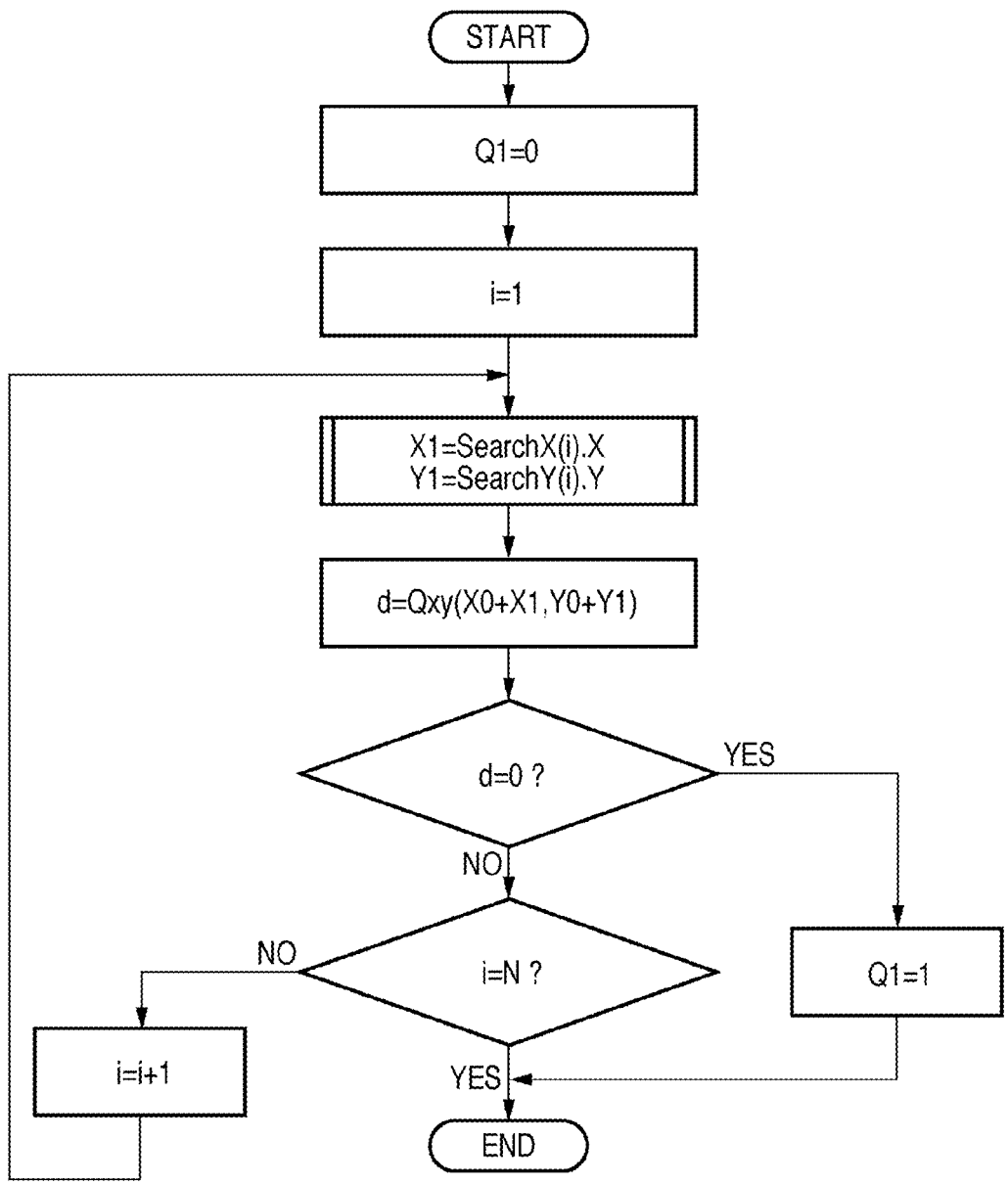
FIG. 18 is a flowchart showing the search processing in the highlight portion.

FIG. 17 shows dot check processing (DotCheck1) in the dark portion processing. FIG. 18 shows dot check processing (DotCheck2) in the highlight portion processing.

When the number of pixels for search N is given, a search is made from the current pixel as a center through the already-binarized pixels outwardly. The purpose of the search is to determine the existence of black dot in the highlight portion and the existence of white dot in the dark portion.

Next, the dark portion processing in FIG. 17 will be described. In this flow, when a target dot exists in the search number of pixels N, Q1=1, otherwise, Q1=0, is returned. When the processing is started, Q1 is set with an initial value "0". Then, a search is made from i=1 to N. The i-th search dot position is calculated from a table. That is, a relative coordinate value (X1,Y1) for the current pixel is obtained (step S60*a*) as follows, from a memory SearchX(i) holding the i-th x-coordinate and a memory SearchY(i) holding the i-th y-coordinate, $$X1 = \text{Search}X(i)$$

$$Y1 = \text{Search}Y(i) \tag{15}$$

Next, an already-binarized pixel value in an absolute coordinate value (X0+X1, Y0+Y1), obtained by adding the extracted relative coordinates (X1,Y1) to the current pixel coordinates (X0,Y0) in the Qxy memory 33, is obtained (step S61*a*).

$$d = Qxy(X0+X1, Y0+Y1) \tag{16}$$

When this d is a white pixel (d=255) (step S62*a*), it is determined that a white pixel exists in the neighborhood of the current pixel, and Q1=1 is returned. When it is determined that a white pixel does not exist, the operation is repeated by i=N. If no white pixel is found even when i=N holds, Q1 is outputted as the initial value "0". The highlight portion processing is similarly performed regarding a black dot.

Figure 19:
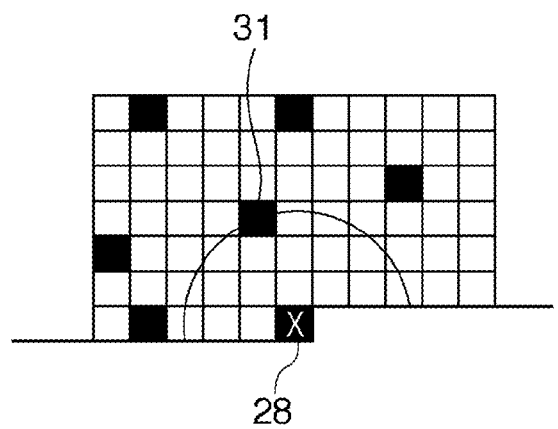
FIG. 19 is an explanatory view of the current pixels and nearest pixels.
Figure 20A:
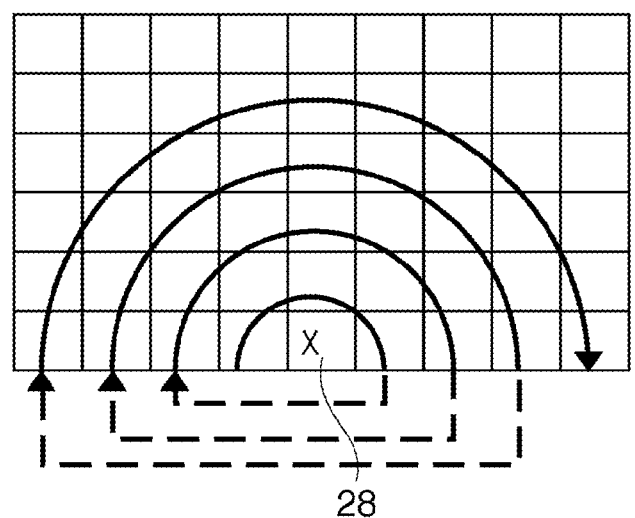
FIGS. 20A and 20B are explanatory views of a pixel search locus.
Figure 20B:
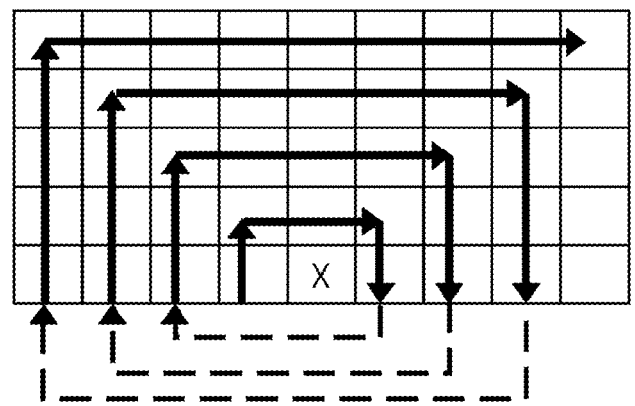

FIG. 19 and FIGS. 20A and 20B show the method for the search. The search is made concentrically from a current pixel X28, while the diameter of the concentric circle is gradually expanded. As a result, a target pixel 31 in the nearest position is found. FIG. 20A shows a clockwise locus of the search (search route) along the concentric circle. The search is sequentially made through pixels without omission and overlap. FIG. 20B shows a rectangular search route. In comparison with the concentric circle, the accuracy of the distance from the current pixel is lower in some degree, however, as the rectangular search is simple, FIG. 20B will be used in the following explanation.

FIG. 21 shows search route information stored in a search route storage unit (not shown) provided in the highlight portion processer and the dark portion processor. As shown in FIG. 21, along the search route, numbers 1, 2, 3, . . . are allotted. FIG. 22 shows a table (corresponding to the above-described SearchX(i) and SearchY(i)) showing relative coordinate values from the current pixel in this search route.

Assuming that the current pixel is represented as (0,0), the i-th pixel position is given as (X1,Y1). The memory SearchX (i) holds the X1 values in the i order, while the memory SearchY(i), the Y1 values in the i order.

Figure 23:
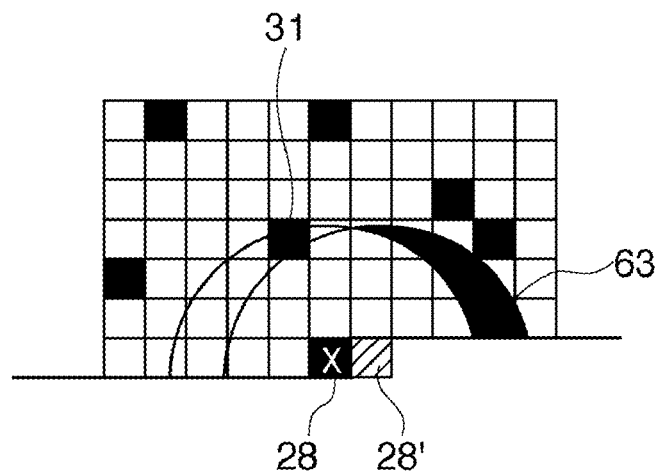
FIG. 23 is an explanatory view of the principle of differential pixel search.

FIG. 23 shows a method for high-speed search. Assuming that a search has been made around a current pixel X28 for a pixel 31 and when the current pixel X28 has been binarized, upon similar search in the next current pixel 28', regarding the pixels already searched in the immediately before processing on the current pixel X28, to avoid overlap of search, the search is made through only pixels in regions except the overlap portion. That is, the search is made through pixels corresponding to a region 63 in FIG. 23.

Figure 24:
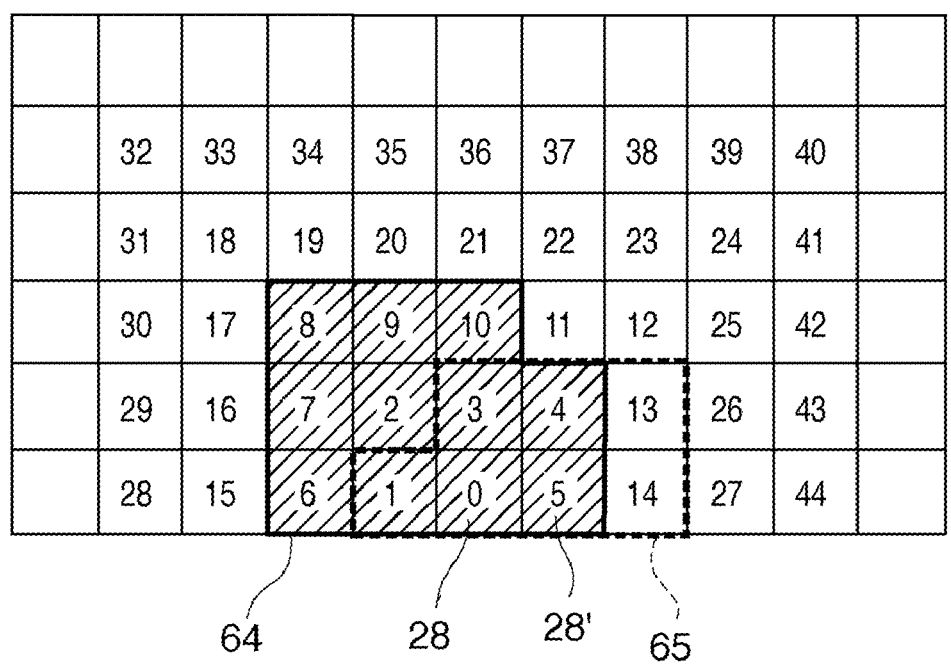
FIG. 24 is an explanatory view showing an example of the differential pixel search.

This processing will be described with reference to FIG. 24 in the case of rectangular search. First, the search has been made up to N=10 with respect to the current pixel 28, and a search region 64 is a search-completed region. Next, regarding the next pixel 28', as a new number of search pixels, N=6 is obtained from the expression (11) or (13). In this case, a region 65 in a broken line frame is a new search region. Accordingly, the pixel search can be made through the pixels in the new region sequentially from i=1 to i=6. At this time, a high-speed search can be made by skipping the overlap pixels. That is, the search is made through only the pixel numbers "13, 14" in FIG. 24.

FIG. 25 is a table, used for detecting a differential pixel, holding corresponding pixels in the search regarding the previous pixel in the order of search regarding the new current pixel 28'. As a new pixel moves in the raster direction (rightward), as a corresponding pixel, a pixel in a right position among the search pixels in FIG. 24 is shown. Accordingly, when N=6 holds, the search is made up to No=6 in the table. In the table in FIG. 25, corresponding Previous(i) indicates a pixel upon previous search. As N=10 holds in the previous search, the search is made through only pixels with values equal to or greater than "10".

Figure 26:
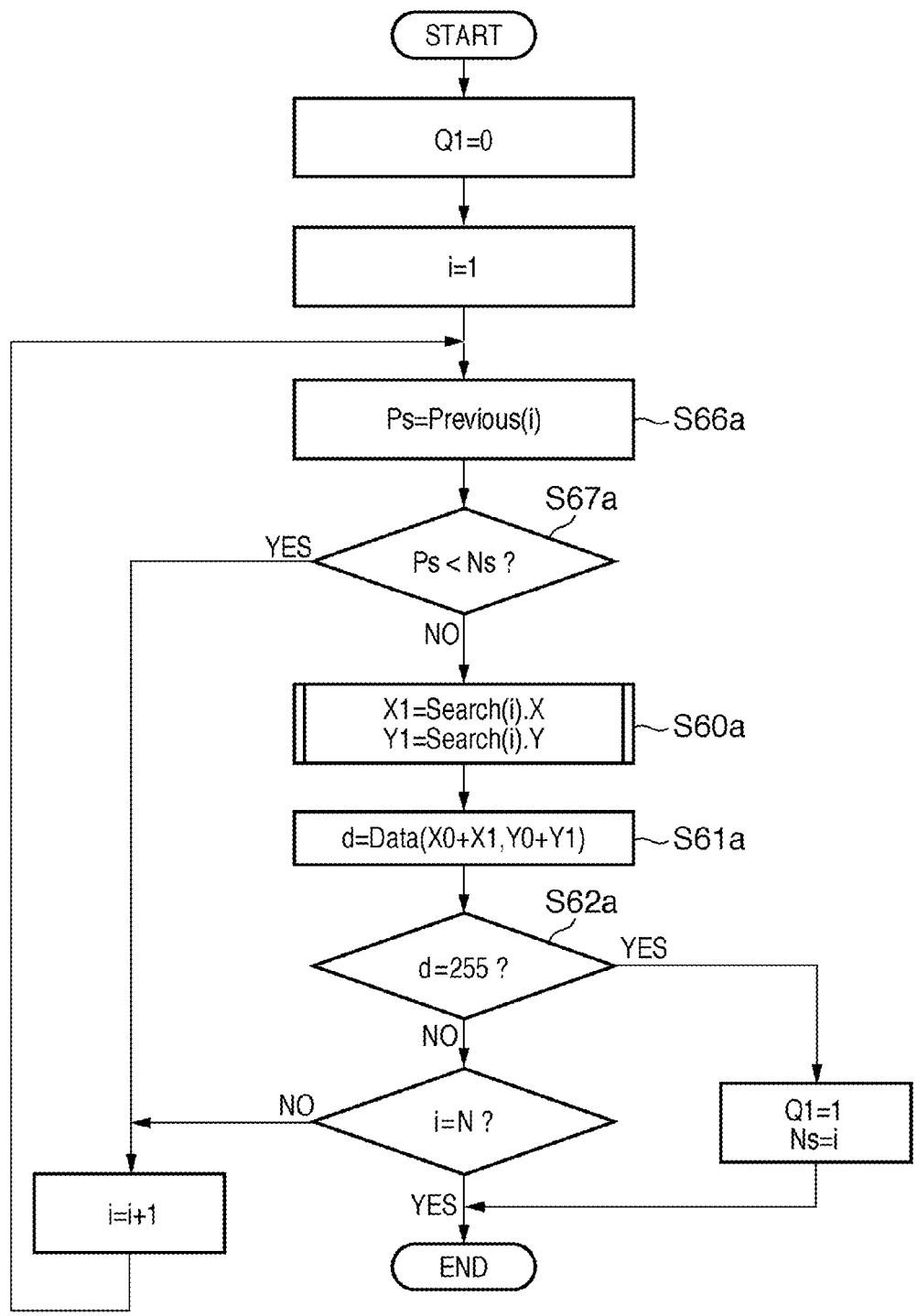
FIG. 26 is a flowchart showing a procedure of the differential pixel search in the dark portion.
Figure 27:
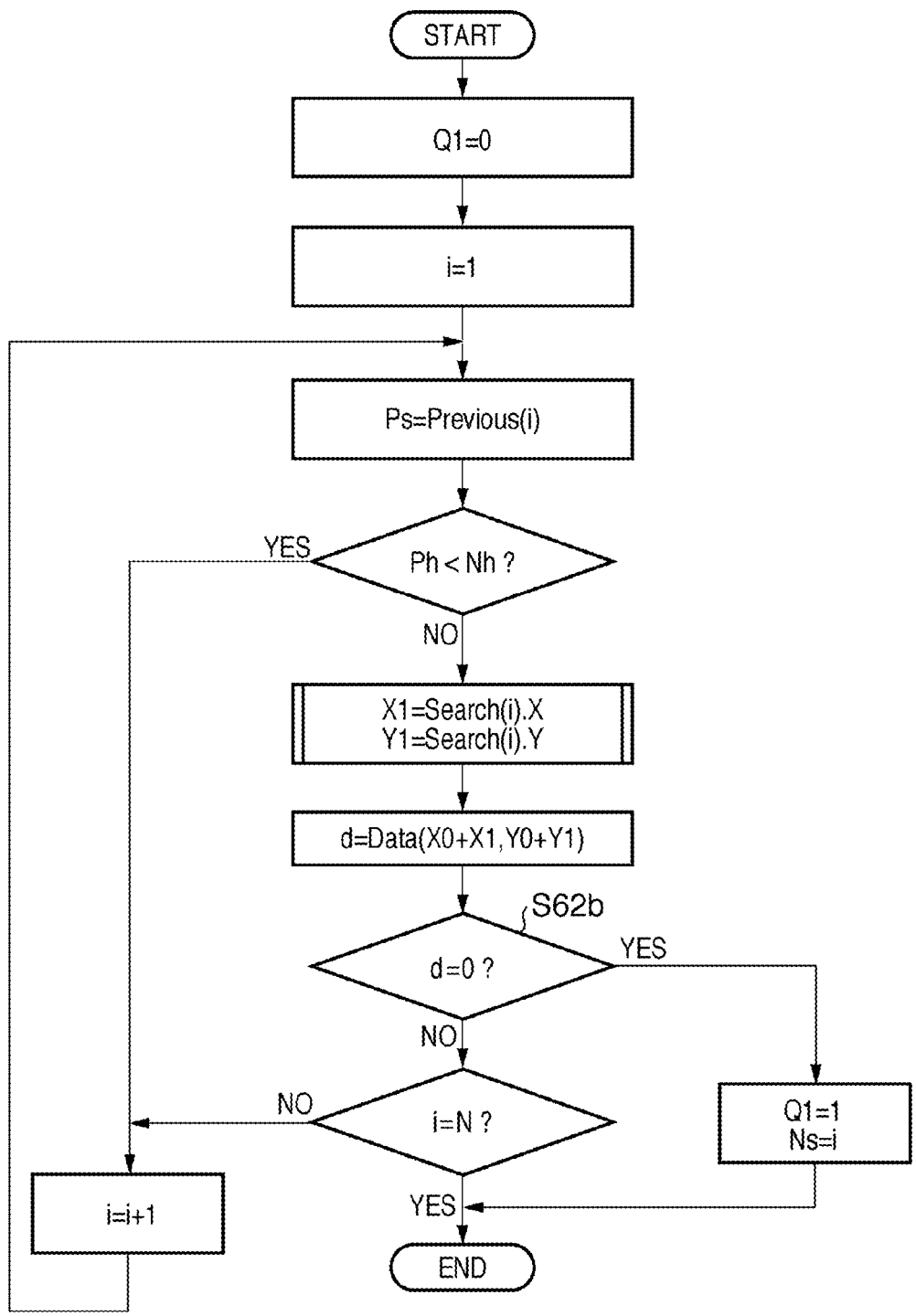
FIG. 27 is a flowchart showing a procedure of the differential pixel search in the highlight portion.

FIGS. 26 and 27 show flowcharts of the high-speed search. FIG. 26 shows the search in the dark portion, and FIG. 27, the search in the highlight portion.

In the dark portion, in FIG. 26, the binarization processing unit 13 starts a search within the number of search pixels N, sequentially from i=1, and obtains Ps=Previous(i) from the table memory shown in FIG. 25 (step S66*a*). When the Ps is less than the previous number of search pixels Ns(step S67*a*), it is determined that the pixel is an already-search pixel, then the subsequent processing is skipped, and the process moves to the next pixel. When Ps≧Ns holds, as it is regarded as a new pixel, processings in steps S60*a* and S61*a*, . . . , similar to those in FIG. 17 are performed. In FIG. 27, similar processing is performed on black pixels.

Figure 28:
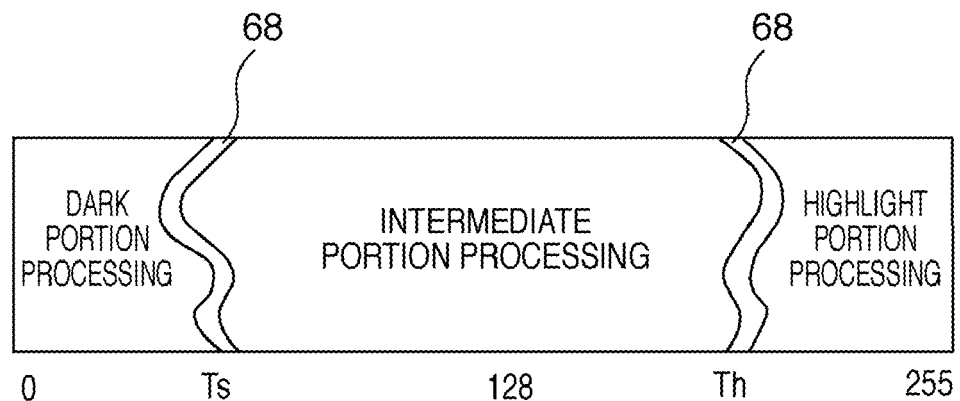
FIG. 28 is an explanatory view of division of processing and discontinuity in a boundary.

The image binarization processing is completed by the above-described processing. In the present invention, as image data is processed in three regions, i.e., a highlight portion, a dark portion and a dark portion, discontinuity may occur in the borders therebetween by different processings. FIG. 28 is a chart showing the discontinuity and continuous change of image data from 0 to 255 from left to right in a gray scale image. The dark portion processing and the intermediate portion processing are separated with the threshold value Ts. As error data and a random number value are added to the image data Pxy, a border 68 is not a linear line but a droop curve. Similarly, in the highlight portion, a discontinuous border occurs around the threshold value Th.

Figure 29:
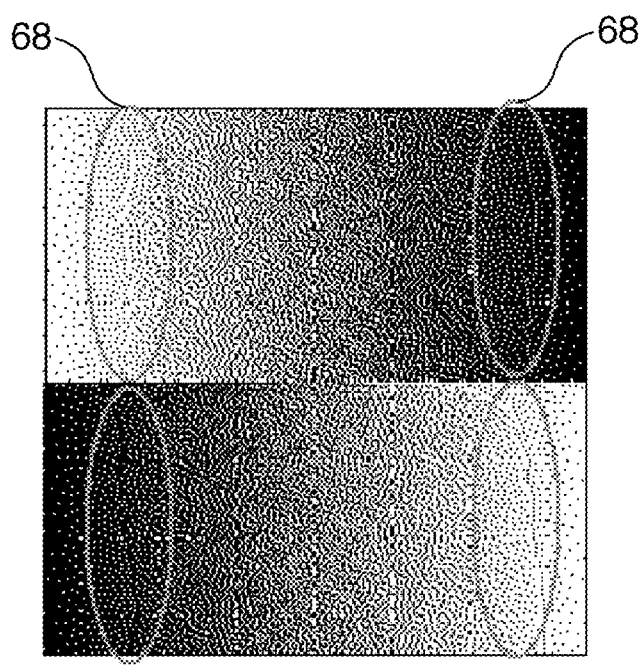
FIG. 29 is an example of a binarized image where discontinuity occurs in a boundary.

FIG. 29 shows a binarized image outputted using a fixed threshold value T=128 in the error diffusion processing in the intermediate portion. A discontinuous border clearly appears in the output image which degrades the image quality. Such image quality degradation is caused by various factors, however, a leading factor is a dot delay phenomenon in error diffusion. Generally, such dot delay occurs, as the above-described "sweep out texture" phenomenon, in a pattern where the image density is radically changed. In the boundary between the dark portion and the intermediate portion, the image density is not radically changed, however, the boundary is conspicuous due to dot delay accompanying the processing change.

Figure 30:
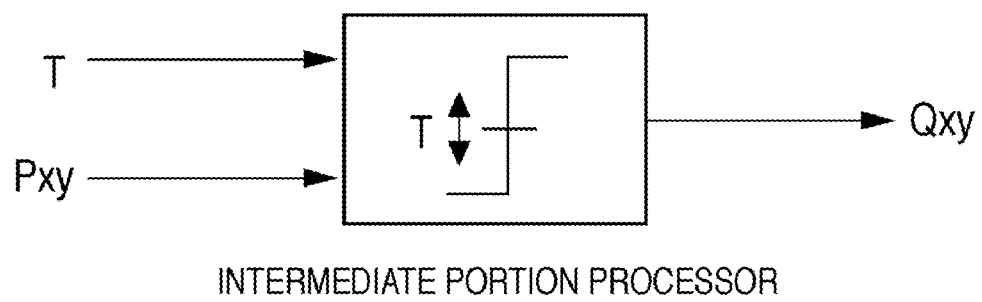
FIG. 30 is a block diagram showing a configuration for the binarization processing with a variable threshold value.

To solve this problem, in the present embodiment, as shown in FIG. 8, the threshold value setting unit 32 is provided. Hereinbelow, the reason for providing the threshold value setting unit 32 and the advantage will be described in accordance with FIG. 30. In FIG. 30, T denotes a binarization threshold which is variable in binarization by the intermediate portion processor 36. Initially, when image data is greatly different from the threshold value, dot delay is caused as a large number of pixels are required in the error-accumulated image data to exceed the threshold value. Accordingly, when the threshold value is set with a value closer to the pixel data, the amount of delay can be reduced.

Figure 31:
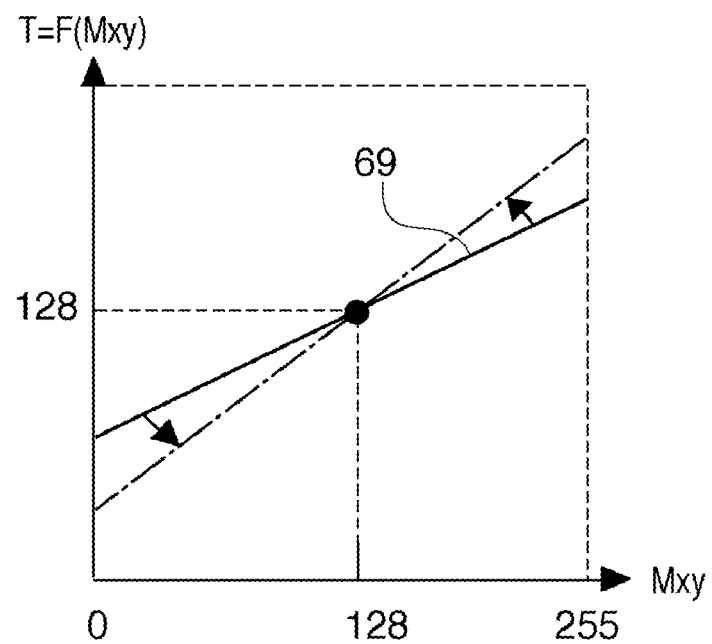
FIG. 31 is a line graph showing a method for determination of the variable threshold value for input image data.

FIG. 31 shows the relation between the threshold value T and the input image data Mxy. The threshold value represented with the expression (5) is monotonically increased with respect to Mxy as follows:

$$T=F(Mxy)=m(Mxy-128)+128 \quad (17)$$

Note that m is a parameter indicating an inclination to variably control a straight line 69 through coordinates (128, 128) as a center at the inclination m. When m=1 holds, T=Mxy holds, and the image data value is determined as a binarization threshold value. At this time, the dot delay phenomenon is reduced. However, as the edges are smoothed, the image quality is degraded. On the other hand, when m=0 holds, T=128 holds as a fixed threshold value which cannot be used for a countermeasure against a discontinuous border. The inventor has run a test using several samples and as a result, m=0.4 to 0.8 are desirable values.

Figure 32A:
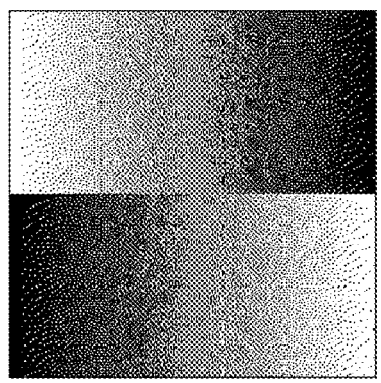
FIGS. 32A and 32B are examples of an output by the error diffusion method by Floyd & Steinberg and an output according to the first embodiment.
Figure 32B:
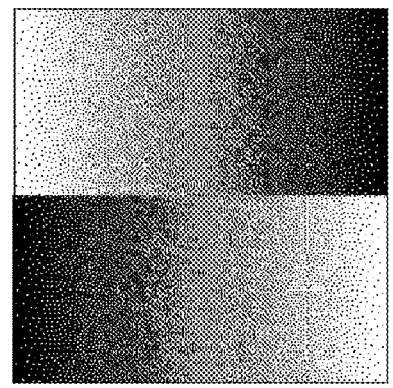

FIGS. 32A and 32B to FIGS. 37A and 37B show image outputs according to the present embodiment. FIG. 32A shows an output by a general error diffusion method using the error diffusion matrix by Floyd & Steinberg in the expression (3). FIG. 32B shows an output by the present embodiment. In this example, threshold values Ts=64 and Th=192 are used, and a random number RND(39) is within a ±10 amplitude range. As it is understood from the figure, the "anisotropy" and "sweep out texture" phenomena disappear, further, no discontinuous border appears in the dark portion, the intermediate portion and the highlight portion, thus very smooth gradation reproduction is attained. FIGS. 33A and 33B show outputs using the following error diffusion matrix by Jarvis.

$$\frac{1}{48}\begin{pmatrix} - & - & X & 7 & 5 \\ 3 & 5 & 7 & 5 & 3 \\ 1 & 3 & 5 & 3 & 1 \end{pmatrix}$$

Figure 33A:
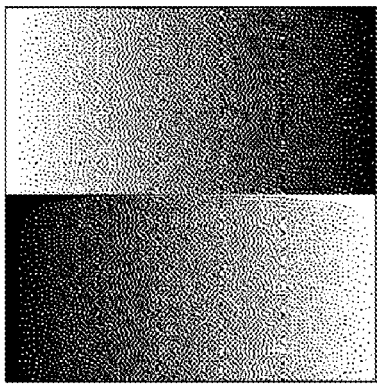
FIGS. 33A and 33B are examples of an output by the error diffusion method by Jarvis and an output according to the first embodiment.
Figure 33B:
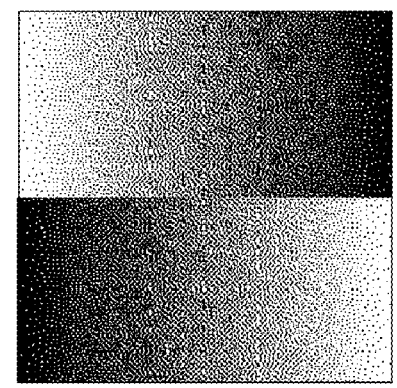

FIG. 33A shows only an error diffusion output. As described above, the "anisotropy" and "sweep out texture" phenomena are changed by the error diffusion matrix, however, as these phenomena are in trade-off relation that one phenomenon is reduced while the other one is increased, it is difficult to solve the both phenomena. On the other hand, FIG. 33B shows an output example by the present invention. It is understood from the figure that a uniform and smooth binarized output where the both problems are solved can be obtained.

Figure 34A:
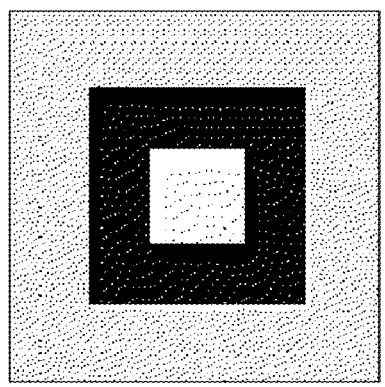
FIGS. 34A and 34B are examples of an output by the error diffusion method by Floyd & Steinberg and an output according to the first embodiment for CG images.
Figure 34B:
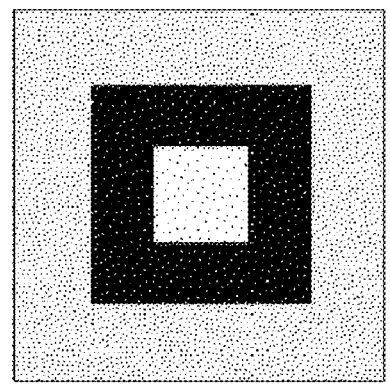
Figure 35A:
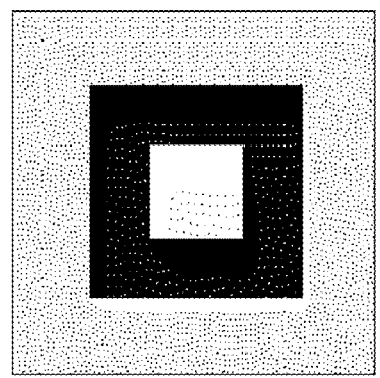
FIGS. 35A and 35B are examples of an output by the error diffusion method by Jarvis and an output according to the first embodiment for CG images.
Figure 35B:
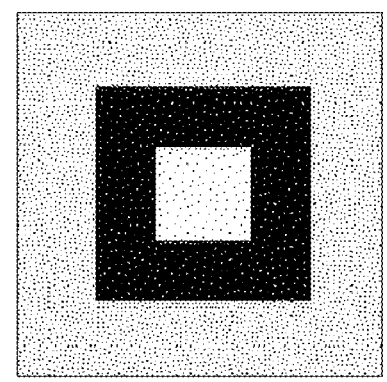

FIGS. 34A and 34B and FIGS. 35A and 35B show CG image output examples. FIG. 34A shows an output using the error diffusion matrix by Floyd & Steinberg, and FIG. 35A, an output using the error diffusion matrix by Jarvis. Similarly, FIGS. 34B and 35B show outputs according to the present embodiment.

Figure 36A:
FIGS. 36A and 36B are examples of an output by the error diffusion method by Floyd & Steinberg and an output according to the first embodiment for natural pictures.
Figure 36B:
Figure 37A:
FIGS. 37A and 37B are examples of an output by the error diffusion method by Jarvis and an output according to the first embodiment for natural pictures.
Figure 37B:
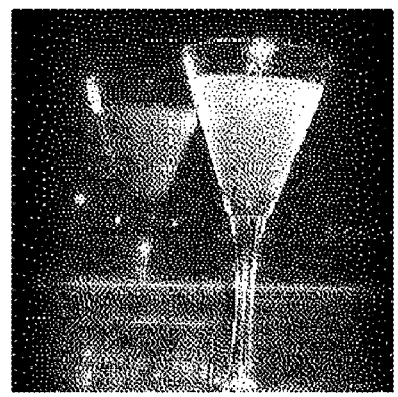

FIGS. 36A and 36B and FIGS. 37A and 37B show natural picture output examples. FIG. 34A shows an output using the error diffusion matrix by Floyd & Steinberg, and FIG. 35A, an output using the error diffusion matrix by Jarvis. Similarly, FIGS. 36B and 37B show outputs according to the present embodiment. In this manner, in the present embodiment, the "anisotropy" and "sweep out texture" phenomena particular to the error diffusion method can be avoided, and further, smooth gradation reproduction without discontinuous border among the dark portion, the intermediate portion and the highlight portion can be achieved.

[Second Embodiment]

Generally, the error diffusion method shows a so-called blue noise characteristic where the intensity of the special frequency characteristic of a printing pattern is lowered on the low frequency side. In electrophotographic recording, as described above, it is necessary to treat dots by cluster and convert the special frequency of already-obtained pattern to a frequency band optimum to the electrophotographic recording.

In the second embodiment, based on the error diffusion method, in an error diffusion method (Error diffusion with output-dependent feedback) by feedback from already-binarized pixels, generation of dots treated by cluster, which is optimum to electrophotograpy (hereinbelow, referred to as a "green noise method") is provided.

FIG. 38 shows signal processing in the green noise method. The structure and features of the green noise method are described in detail in Daniel L. Lau, Gonzalo R. Arce, "Modern Digital Halftoning (Signal Processing and Communications)" and U.S. Pat. No. 6,798,537 B1. The signal processing in the green noise method will be described in accordance with FIG. 38.

Input pixel data M70 is binarized by a binarization processing circuit 80, thereby output pixel data Q73 is obtained. Further, an error caused by the binarization is obtained by an error detector 74 as error data, and the error is diffused with an error diffusion matrix B(76). The diffusion is performed to unbinarized pixels, and error data Xe77 diffused to the respective pixels is added to (when negative, subtracted from) the unbinarized pixel data by an adder 71, thus updated as new image data.

On the other hand, plural pixel data on already-binarized pixels (already binarization-processed pixels where the pixel data as luminance values are "0 (black)" or "255 (white)" in 8-bit/pixel/color representation) are inputted into a green noise matrix 81, and subjected to calculation. The result of calculation is supplied to a gain calculator 82, and a feedback amount (green noise data) Xh83, multiplied by a constant gain amount, is added to output data from the adder 71 by another adder 78. That is, the error data Xe and the green noise data Xh are added to the input image data M, and the image data M is updated to pixel data P79.

$$P=M+Xe+Xh \quad (19)$$

On the other hand, the binarization processing circuit 80 performs binarization;

When P≧T holds, Q=255

When P<T holds, Q=0 (20)

Note that T is a threshold value for binarization processing. The output Q, when in 8-bit representation, is "255" or "0", however, when normalized, may be "1" or "0".

Figure 39:
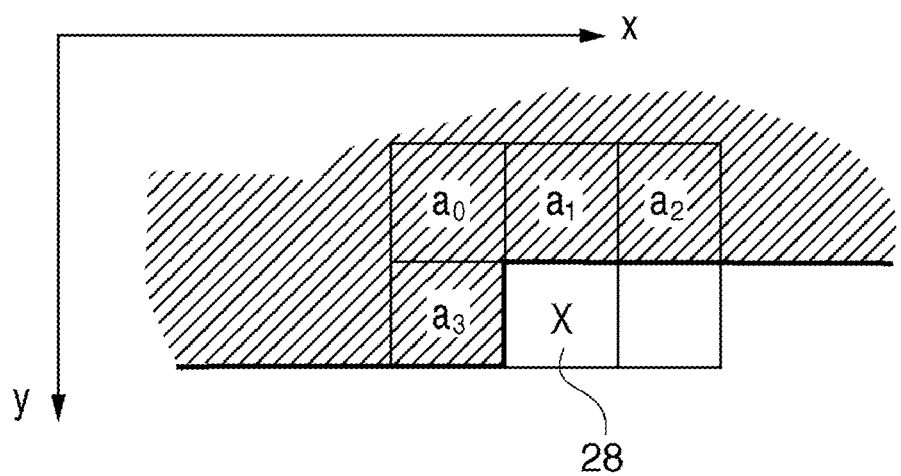
FIG. 39 is an explanatory view of a reference pixel in the green noise method.

FIG. 39 shows a reference position for an already-binarized pixel and a weighting factor. Numeral X28 denotes a current pixel, and hatched portions above and left side of the current pixel X28 indicate the already-binarized pixels. Numerals a0, a1, a2 . . . denote reference pixel positions and intensities. The reference pixels are already-binarized pixels to the current pixel X28 and neighboring pixels of the current pixel X. As the image quality is changed in accordance with selection of these reference pixels, the selection must be performed carefully. A reference pixel intensity coefficient ai indicates data reading from a pixel. When ai is "0", no data reading is performed from a corresponding pixel. Further, the coefficient ai is normalized such that Σai=1 holds. Accordingly, an output from the gain calculator 82 (gain value) is represented with the following expression.

$$Xh = h \times \Sigma\{ai * Qi\} \quad (21)$$

In the expression, h is a gain coefficient, and Qi, the i-th reference pixel for the already-binarized pixel. The output is added by the second adder 78 as pixel data P79. The binarization processing circuit 80 performs binarization processing on the pixel data P79 and outputs output pixel data Q73.

Figure 40A:
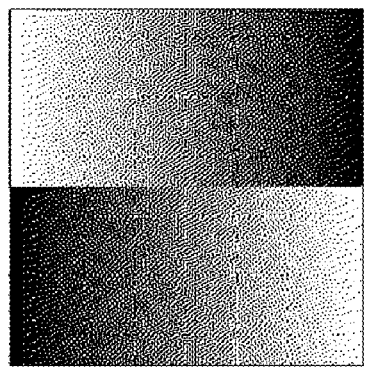
FIGS. 40A and 40B are examples of an output in the green noise method based on the error diffusion method by Floyd & Steinberg and an output in the green noise method based on the error diffusion method by Jarvis.
Figure 40B:
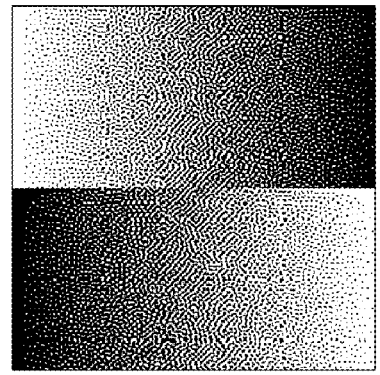

FIGS. 40A and 40B show image outputs using the green noise method. FIG. 40A shows an output using the error diffusion matrix by Floyd & Steinberg with a gain coefficient h=0.5. FIG. 40B shows an output using the error diffusion matrix by Jarvis with a gain coefficient h=0.2. Dot cluster processing is performed by the green noise method, however, the "anisotropy" and "sweep out texture" phenomena remain. In this example, as a reference pixel matrix C in the green noise method (hereinafter referred to as a "green noise matrix") C, a matrix shown in FIG. 42A is employed.

$$C = \frac{1}{2}\begin{pmatrix} 0 & 1 \\ 1 & X \end{pmatrix}$$

In the matrix, X represents a current pixel position. Further, other various matrices such as a matrix as shown in FIG. 42B may be used as a green noise matrix. In this example, although the image quality in the intermediate portion differs, the processing will be described using the matrix in FIG. 42A.

Figure 41:
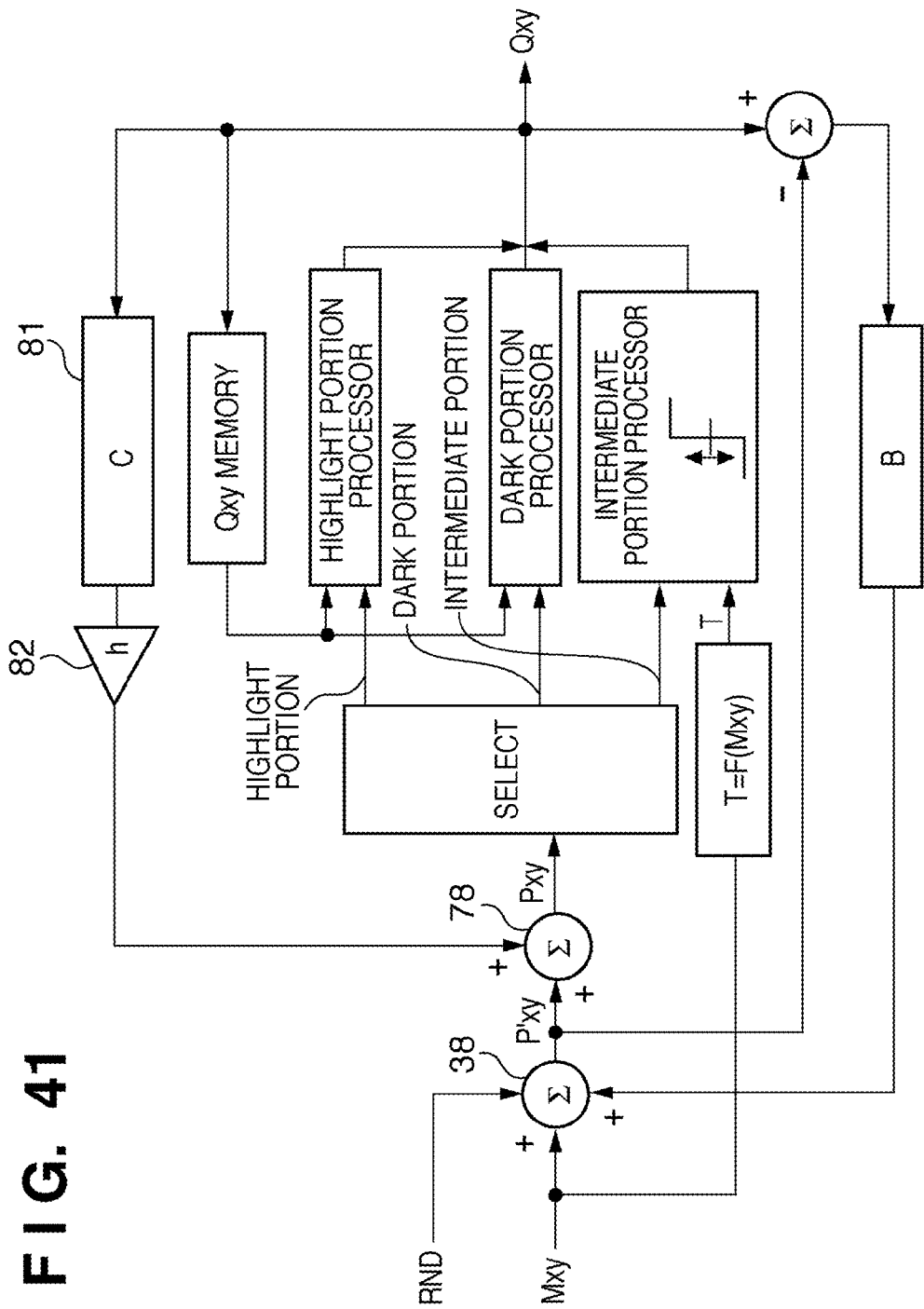
FIG. 41 is a block diagram showing the binarization processing unit according to a second embodiment of the present invention.

FIG. 41 is a block diagram showing the configuration of the binarization processing unit 13 according to the second embodiment. An output from the green noise matrix 81 based on already-binarized data is multiplied by the coefficient h by the gain calculator 82, and added by the adder 78 to an input signal P'xy, to which an error signal and a random number value are added, and a signal Pxy is obtained. The subsequent processing is the same as that described in the above first embodiment.

In FIG. 43 showing the dark portion, the intermediate portion and the highlight portion separated with the threshold values Ts and Th, the threshold values Ts and Th are controlled in connection with the gain coefficient h. That is, when the gain coefficient h is increased, dot clustering in the intermediate portion is progressed. On the other hand, the interval between black and white dots in the highlight portion and the dark portion becomes narrower when it is closer to the intermediate portion. Accordingly, to match the dot interval with that in the intermediate portion, the threshold value Ts is reduced as indicated with an arrow 87a in the figure, while the threshold value Th is increased as indicated with an arrow 87b. This reduces the regions of the highlight portion and the dark portion, to attain conformance between the highlight and dark portions and the intermediate portion.

Figure 44:
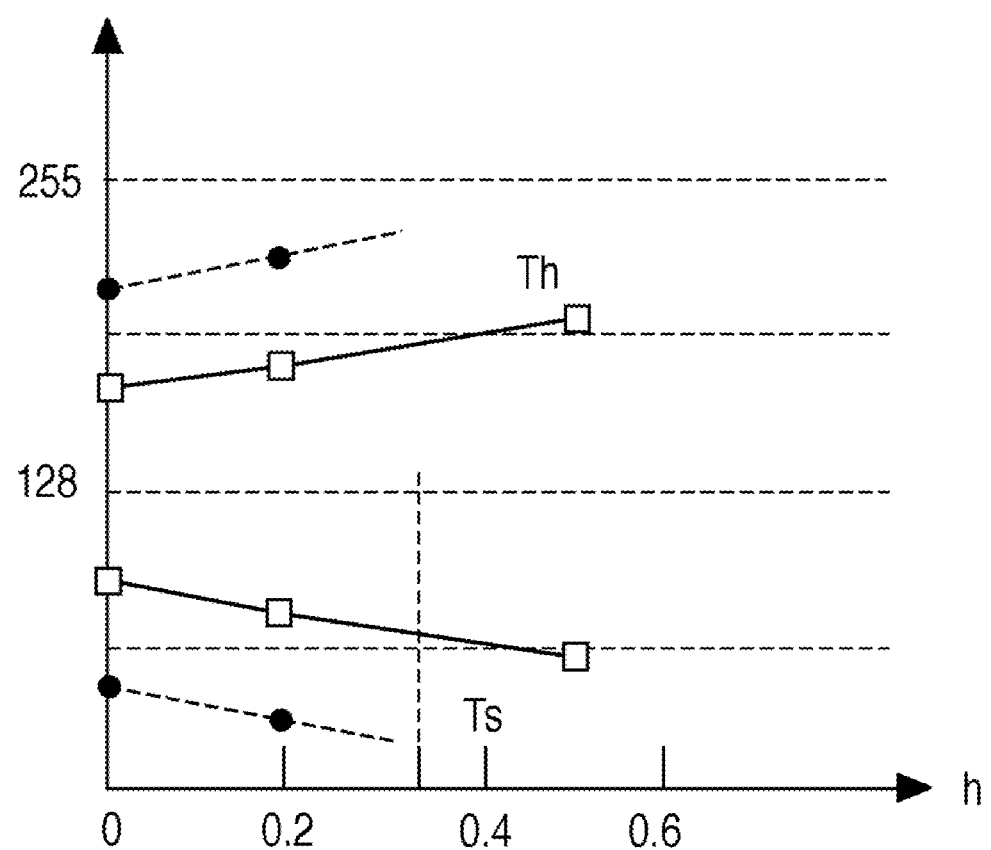
FIG. 44 is a line graph showing the relation between a gain coefficient h and threshold values Ts and Th in the green noise method according to the second embodiment.

FIG. 44 shows variations of the threshold values Ts and Th and the gain coefficient h. In FIG. 44, a solid line indicates the variations upon use of the error diffusion matrix by Floyd & Steinberg, and a broken line, upon use of the error diffusion matrix by Jarvis. The possible width of the gain coefficient h when the maximum image quality is obtained is about 0 to 0.5 in the case of the error diffusion matrix by Floyd & Steinberg, and about 0 to 0.2 in the case of the error diffusion matrix by Jarvis. When the value of the gain coefficient h is greater, the shape of dot cluster is flown one-directionally. When h=0 holds, other method than that using the green noise method, i.e., that in the first embodiment is employed.

Figure 45B:
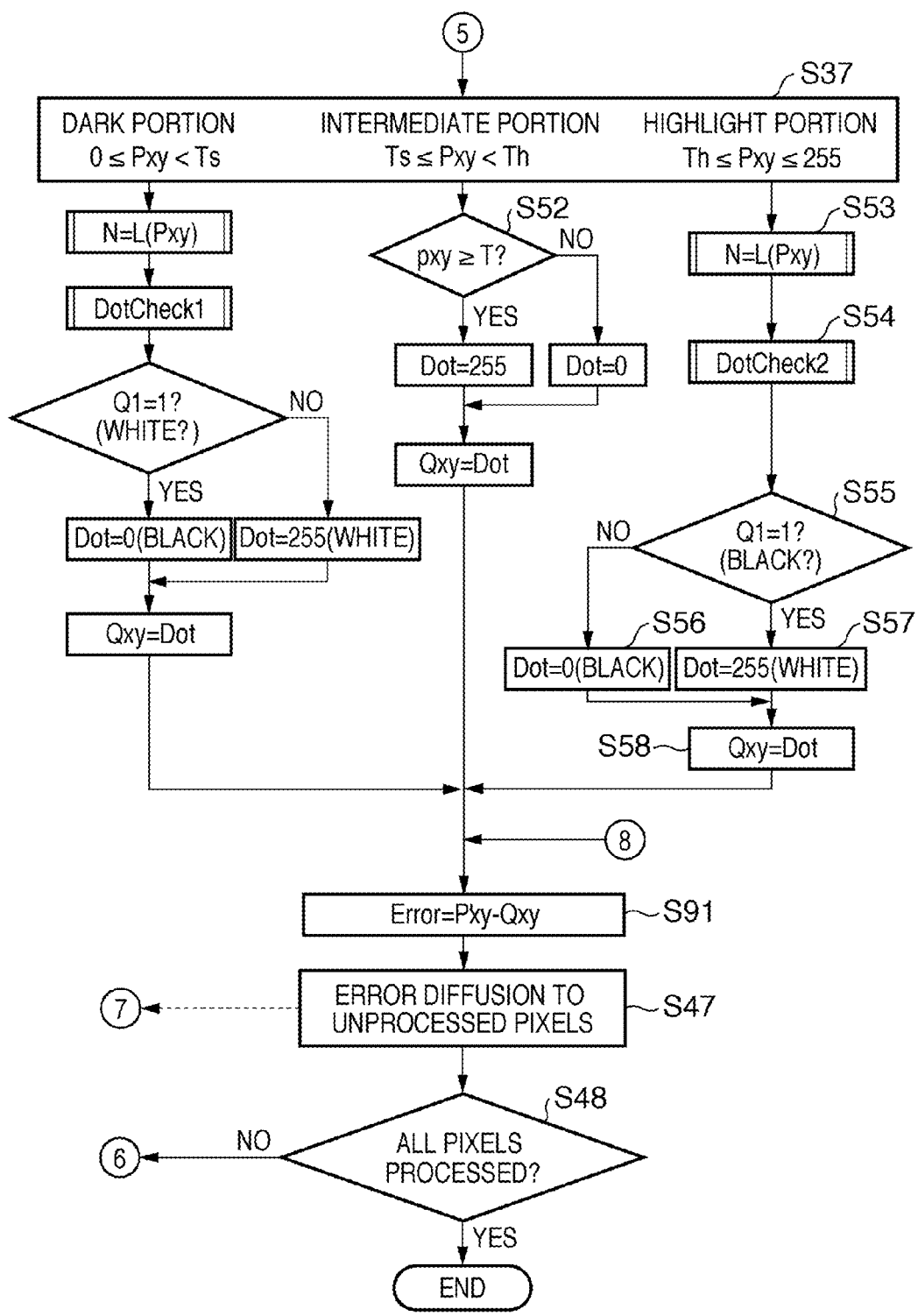

FIGS. 45A and 45B are flowcharts showing the entire processing in the second embodiment. In the flowchart, steps S88 to S91 are newly added or changed.

First, in step S88, an appropriate gain coefficient h is given. The gain coefficient h is determined in correspondence with a cluster size optimum to the recording apparatus from the characteristic of the apparatus. When the gain coefficient h has been determined, in accordance with type of error diffusion matrix, optimum threshold values Ts and Th are obtained using FIG. 44. Thereafter, the processing is performed on a raster image input. In steps S89 and S90, green noise is added to the pixel data. After the processings in the highlight portion, the dark portion and the intermediate portion, an error (difference) from the output Qxy is calculated in step S91. At this time, the error is calculated using the image data value P'xy prior to the addition of the green noise value. The green noise is used for dot control upon binarization, and it does not contribute to actual image data. The other processing is the same as that in the first embodiment.

Figure 46A:
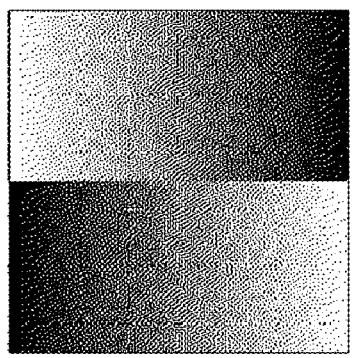
FIGS. 46A and 46B are examples of an output in the green noise method based on the error diffusion method by Floyd & Steinberg and an output according to the second embodiment.
Figure 46B:
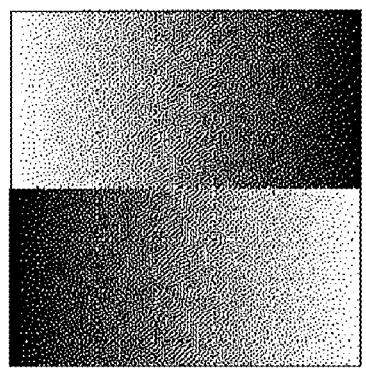

FIGS. 46A and 46B to FIGS. 48A to 48C are image output results according to the present invention in comparison with general green noise outputs. FIG. 46A shows an output by a green noise method with the error diffusion matrix by Floyd & Steinberg and the gain coefficient h=0.5; FIG. 46B, an output by the image processing according to the second embodiment with the threshold values Ts=60 and Th=195. As it is understood from the comparison therebetween, dot clustering in the intermediate portion by the green noise method is performed in the method according to the second embodiment, and further, the dot "anisotropy" and "sweep out texture" phenomena are avoided and smooth characteristics are shown in all the tone levels.

Figure 47A:
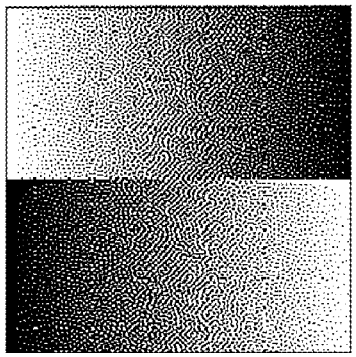
FIGS. 47A to 47C are examples of an output in the green noise method based on the error diffusion method by Jarvis, an image output with fixed threshold values Ts and Th according to the second embodiment, and an output with variable threshold values Ts and Th.
Figure 47B:
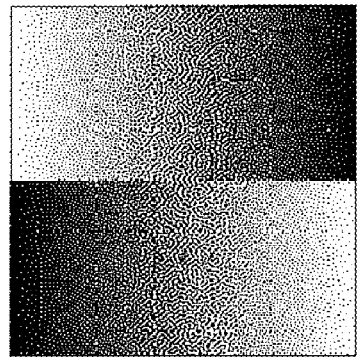
Figure 47C:
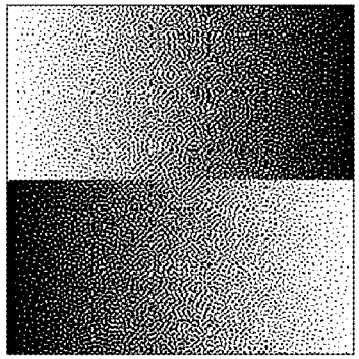

FIGS. 47A to 47C show image outputs using the error diffusion matrix by Jarvis. FIG. 47A shows an output by the general green noise method with the gain coefficient h=0.2. In the case of the error diffusion matrix by Jarvis, the dot "anisotropy" phenomenon is comparatively inconspicuous, however, the "sweep out texture" phenomenon is conspicuous. In FIG. 47B in accordance with the flowchart of FIGS. 45A and 45B, the threshold values Ts and Th in step S88 are not variable but fixed as Ts=60 and Th=195 (These values are optimum values when h=0 holds). In the highlight portion and the dark portion, dots near the intermediate portion are too minute, and conformance with the cluster size in the intermediate portion is not attained. In FIG. 47C, it is understood that in step S88, when the threshold values are variable as Ts=30 and Th=225, smooth clustered dots are reproduced in the highlight portion, the intermediate portion and the dark portion.

FIGS. 48A to 48C show natural picture output examples according to the second embodiment. FIG. 48A shows an image using the error diffusion matrix by Floyd & Steinberg with the coefficient h=0 and the threshold values Ts=80 and Ts=170; FIG. 48B, an image using the error diffusion matrix by Floyd & Steinberg with the coefficient h=0.5 and the threshold values Ts=60 and Th=195; and FIG. 48C, an image using the error diffusion matrix by Jarvis with the coefficient h=0.2 and the threshold values Ts=30 and Th=225. The dot clustering is improved from FIG. 48A to FIG. 48C, however, any "anisotropy" or "sweep out texture" phenomenon does not appear.

As described above, the second embodiment provides an image processing apparatus capable of high-quality cluster type FM halftone image output without "anisotropy" or "sweep out texture" phenomenon. Further, it is possible to generate a dot cluster corresponding to individual MTF characteristic of each electrophotographic recording apparatus, and enable stable image output.

The embodiments according to the present invention are as described above. In the embodiments, multi-level image data as a subject of binarization is represented with 8 bits (256 levels) per 1 pixel, however, the present invention is not limited to this representation. Further, the multi-level image data as a subject of binarization is represented only with a luminance component, however, in the case of color image represented with plural components, the processing in the above embodiments is performed on the respective color components.

[Other Embodiments]

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-264626, filed Oct. 10, 2008, which is hereby incorporated by reference herein in its entirety.

What is claimed is:

1. An image processing apparatus for converting multi-level image data to binary image data using an error diffusion method, comprising:
   an update unit configured to add an error, diffused to a position of multi-level pixel data as a subject of binarization, to said pixel data, thereby update said pixel data;
   a determiner configured to determine whether current pixel data belongs to a highlight portion, a dark portion or an intermediate portion, by comparing a value of the current pixel data updated by said update unit with predetermined threshold values Ts and Th;
   a highlight portion processor configured to, when said determiner determines that said current pixel data belongs to said highlight portion, refer to already-binarized results in a range determined in accordance with the value of said current pixel data, and determine a value of binary pixel data corresponding to said current pixel data;
   a dark portion processor configured to, when said determiner determines that said current pixel data belongs to said dark portion, refer to the already-binarized results in the range determined in accordance with the value of said current pixel data, and determine the value of the binary pixel data corresponding to said current pixel data;
   an intermediate portion processor configured to, when said determiner determines that said current pixel data belongs to said intermediate portion, compare a threshold value T monotonously increasing in accordance with the value of said current pixel data with the value of said current pixel data, thereby determine the value of the binary pixel data corresponding to said current pixel data; and
   a diffuser configured to diffuse a difference between the value of said current pixel data and the value of the binary pixel data determined by said highlight portion processor, said dark portion processor or said intermediate portion processor, to unbinarized pixel positions in the neighborhood of the pixel position of said current pixel data.

2. The image processing apparatus according to claim 1, wherein assuming that a distance determined in accordance with the pixel value of said current pixel data is r0 and a distance from the pixel position of said current pixel data to a position of a binary pixel indicating a black pixel nearest from the pixel position of said current pixel data is r, when a condition: r>r0 is satisfied, said highlight portion processor determines the binary pixel data corresponding to said current pixel data as a black pixel, while when said condition is not satisfied, determines the binary pixel data corresponding to said current pixel data as a white pixel,
   and wherein assuming that a distance determined in accordance with the pixel value of said current pixel data is r0 and a distance from the pixel position of said current pixel data to a position of a binary pixel indicating a white pixel nearest from the pixel position of said current pixel data is r, when a condition: r>r0 is satisfied, said dark portion processor determines the binary pixel data corresponding to said current pixel data as a white pixel, while when said condition is not satisfied, determines the binary pixel data corresponding to said current pixel data as a black pixel.

3. The image processing apparatus according to claim 2, wherein as brightness of the value of said current pixel data is increased, said distance r0 in said highlight portion processor is increased,
   and wherein as the brightness of the value of said current pixel data is reduced, said distance r0 in said dark portion processor is increased.

4. The image processing apparatus according to claim 2, further comprising a route storage unit configured to store a search route from the position of said current pixel data as a center gradually away from the center, within an already-binarized region,
   wherein said highlight portion processor determines a number of search pixels N determined depending on the value of said current pixel data, and searches binarized black pixels up to said number of search pixels N in accordance with the search route stored in said route storage unit, thereby determines whether or not said condition is satisfied,
   and wherein said dark portion processor determines the number of search pixels N determined depending on the value of said current pixel data, and searches binarized white pixels up to said number of search pixels N in accordance with the search route stored in said route storage unit, thereby determines whether or not said condition is satisfied.

5. The image processing apparatus according to claim 4, further comprising a table for excluding overlap pixel positions between a search route upon binarization of immediately previous pixel data of said current pixel data and a search route determined in accordance with the value of said current pixel data, from search subjects,
   wherein said highlight portion processor and said dark portion processor refer to said table and search the binarized pixel data.

6. The image processing apparatus according to claim 1, wherein said update unit further adds a random number value which varies within a predetermined amplitude range to said pixel data as the subject of binarization.

7. The image processing apparatus according to claim 1, further comprising:
   a gain calculation unit configured to calculate a gain based on a predetermined number of binarized pixel data in the neighborhood of the pixel position of said current pixel data and a gain coefficient h;
   an adder configured to add the gain calculated by said gain calculation unit to the value of said current pixel data updated by said update unit and output the current pixel data to which said gain is added to said determiner; and
   a control unit configured to control said threshold values Ts and Th based on said gain coefficient h.

8. A control method for an image processing apparatus for converting multi-level image data to binary image data using an error diffusion method, comprising:
   an update step of adding an error, diffused to a position of multi-level pixel data as a subject of binarization, to said pixel data, thereby updating said pixel data;
   a determination step of determining whether current pixel data belongs to a highlight portion, a dark portion or an intermediate portion, by comparing a value of the current pixel data updated at said update step with predetermined threshold values Ts and Th;
   a highlight portion processing step of, when it is determined at said determination step that said current pixel data belongs to said highlight portion, referring to already-binarized results in a range determined in accordance with the value of said current pixel data, and determining a value of binary pixel data corresponding to said current pixel data;
   a dark portion processing step of, when it is determined at said determination step that said current pixel data belongs to said dark portion, referring to the already-binarized results in the range determined in accordance with the value of said current pixel data, and determining the value of the binary pixel data corresponding to said current pixel data;
   an intermediate portion processing step of, when it is determined at said determination step that said current pixel data belongs to said intermediate portion, comparing a threshold value T monotonously increasing in accordance with the value of said current pixel data with the value of said current pixel data, thereby determining the value of the binary pixel data corresponding to said current pixel data; and
   a diffusion step of diffusing a difference between the value of said current pixel data and the value of the binary pixel data determined at said highlight portion processing step, said dark portion processing step or said intermediate portion processing step to unbinarized pixel positions in the neighborhood of the pixel position of said current pixel data; wherein the method is executed by at least one processor.

9. A non-transitory computer-readable storage medium holding a computer program, read and executed by a computer, for causing said computer to function as the image processing apparatus according to claim 1.

* * * * *